US012046214B2

(12) United States Patent
Van Ostrand

(10) Patent No.: US 12,046,214 B2
(45) Date of Patent: Jul. 23, 2024

(54) DISPLAY CONTROLLER WITH ROW ENABLE BASED ON DRIVE SETTLE DETECTION

(71) Applicant: SIGMASENSE, LLC., Wilmington, DE (US)

(72) Inventor: Daniel Keith Van Ostrand, Leander, TX (US)

(73) Assignee: SIGMASENSE, LLC., Austin, TX (US)

( * ) Notice: Subject to any disclaimer, the term of this patent is extended or adjusted under 35 U.S.C. 154(b) by 306 days.

(21) Appl. No.: 16/362,447

(22) Filed: Mar. 22, 2019

(65) Prior Publication Data

US 2020/0302888 A1 Sep. 24, 2020

(51) Int. Cl.
*G09G 3/36* (2006.01)

(52) U.S. Cl.
CPC ... *G09G 3/3688* (2013.01); *G09G 2300/0452* (2013.01); *G09G 2300/0809* (2013.01); *G09G 2310/0243* (2013.01); *G09G 2320/0223* (2013.01)

(58) Field of Classification Search
CPC ......... G09G 3/3688; G09G 2300/0452; G09G 2300/0809; G09G 2310/0243; G09G 2320/0223
See application file for complete search history.

(56) References Cited

U.S. PATENT DOCUMENTS

| | | | |
|---|---|---|---|
| 5,437,178 | A | 8/1995 | Esin et al. |
| 6,218,972 | B1 | 4/2001 | Groshong |
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |

(Continued)

FOREIGN PATENT DOCUMENTS

| | | | |
|---|---|---|---|
| CN | 103995626 | A | 8/2014 |
| CN | 104182105 | A | 12/2014 |

(Continued)

OTHER PUBLICATIONS

Baker; How delta-sigma ADCs work, Part 1; Analog Applications Journal; Oct. 1, 2011; 6 pgs.

(Continued)

*Primary Examiner* — Stephen G Sherman
(74) *Attorney, Agent, or Firm* — GARLICK & MARKISON; Timothy W. Markison

(57) ABSTRACT

A display control unit includes a data drive unit, a gate drive unit, a drive settle detection circuit, and a row enable module. The data drive unit generates data drive signals for driving data lines of a display. The gate drive unit drives gate lines of the display in an order based on a row enable signal. The drive settle detection circuit monitors a set of data drive signals for an activated gate line. The drive settle detection circuit also sets a settled signal for the activated gate line when each drive signal of the set of drive signals has reached a corresponding settling threshold. The row enable module ends, as part of the row enable signal, activation of the activated gate line based on the settled signal and activates, as part of the row enable signal, another gate line based on the settled signal.

16 Claims, 18 Drawing Sheets

(56) References Cited

U.S. PATENT DOCUMENTS

| | | | | |
|---|---|---|---|---|
| 8,089,289 | B1 | 1/2012 | Kremin et al. | |
| 8,279,180 | B2 | 10/2012 | Hotelling et al. | |
| 8,537,110 | B2 | 9/2013 | Kruglick | |
| 8,547,114 | B2 | 10/2013 | Kremin | |
| 8,587,535 | B2 | 11/2013 | Oda et al. | |
| 8,625,726 | B2 | 1/2014 | Kuan | |
| 8,657,681 | B2 | 2/2014 | Kim | |
| 8,966,400 | B2 | 2/2015 | Yeap | |
| 8,982,097 | B1 | 3/2015 | Kuzo et al. | |
| 9,081,437 | B2 | 7/2015 | Oda | |
| 9,201,547 | B2 | 12/2015 | Elias | |
| 9,626,905 | B2 | 4/2017 | In | |
| 10,007,335 | B2 | 6/2018 | Lee | |
| 2003/0052657 | A1 | 3/2003 | Koernle et al. | |
| 2005/0235758 | A1 | 10/2005 | Kowal et al. | |
| 2008/0079711 | A1* | 4/2008 | Ishii | H04N 9/312<br>345/215 |
| 2009/0189839 | A1* | 7/2009 | Ko | G09G 3/3648<br>345/87 |
| 2010/0245212 | A1 | 9/2010 | Dallas | |
| 2011/0063154 | A1 | 3/2011 | Hotelling et al. | |
| 2011/0298745 | A1 | 12/2011 | Souchkov | |
| 2012/0278031 | A1 | 11/2012 | Oda | |
| 2013/0278447 | A1 | 10/2013 | Kremin | |
| 2014/0232626 | A1 | 8/2014 | Jamshidi-Roudbari | |
| 2014/0327644 | A1 | 11/2014 | Mohindra | |
| 2015/0091847 | A1 | 4/2015 | Chang | |
| 2015/0346889 | A1 | 12/2015 | Chen | |
| 2016/0188049 | A1 | 6/2016 | Yang et al. | |
| 2018/0157354 | A1 | 6/2018 | Blondin et al. | |
| 2018/0182355 | A1* | 6/2018 | Kobayashi | G09G 5/10 |
| 2018/0275824 | A1 | 9/2018 | Li | |
| 2018/0330655 | A1* | 11/2018 | Tsuchi | G09G 3/3688 |
| 2019/0156764 | A1* | 5/2019 | Kim | G09G 3/3685 |
| 2019/0392773 | A1* | 12/2019 | Higuchi | G09G 3/3677 |

FOREIGN PATENT DOCUMENTS

| | | | |
|---|---|---|---|
| CN | 104536627 | A | 4/2015 |
| CN | 107771273 | A | 3/2018 |
| EP | 2284637 | A1 | 2/2011 |

OTHER PUBLICATIONS

Brian Pisani, “Digital Filter Types in Delta-Sigma ADCs”, Application Report SBAA230, May 2017, pp. 1-8, Texas Instruments Incorporated, Dallas, Texas.

International Searching Authority; International Search Report and Written Opinion; International Application No. PCT/US2020/023746; dated Jun. 16, 2020; 8 pgs.

Brotherton, S.D.. Introduction to Thin Film Transistors: Physics and Technology of TFTs. Germany: Springer International Publishing, 2013. Available at: https://books.google.com/books?id=E0x0Zghk7okC&lpg=PP2&pg=PA2∩v=onepage&q&f=false (Accessed Sep. 11, 2023).

European Patent Office; Extended European Search Report; Application No. 19853507.2; Jun. 13, 2023; 7 pgs.

* cited by examiner computing device 10 display 12 display 12 transparent electrode (ITO) layer 97 with thin film transistors row enable signal 68 circuit 100

DISPLAY CONTROLLER WITH ROW ENABLE BASED ON DRIVE SETTLE DETECTION

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to displays and more particularly to controlling a display.

Description of Related Art

Displays are used in a wide variety of devices. For example, computers, cell phones, tables, televisions, video game units all include a display. Some of these devices further include a touch screen display, where user inputs are received via a touch sensing function of the display.

A display includes a plurality of pixels arranged in rows and columns. A pixel includes three sub-pixels: a red sub-pixel, a green sub-pixel, and a blue sub-pixel. Each sub-pixel is provided a signal to produce a desired color for the pixel. To render an image on the display, each sub-pixel of every pixel of the display is provided a unique signal.

For a display with 1920 columns and 1080 rows of pixels, there are a total of 3×1920×1080=6,220,800 sub-pixels. To limit the number of sub-pixel data drive circuits (i.e., the circuits that produce the signals for the sub-pixels), only one row of sub-pixels is enabled at a time. This reduces the number of sub-pixel drive circuits from 6,220,800 to 5,760 for this example.

Many displays have a refresh rate of 60 Hz. As such, each sub-pixel receives a new signal 60 times a second. By equaling enabling a row at a time, each row is active for $\frac{1}{1080}\times\frac{1}{60}$=15.4 micro-seconds for this example. As the refresh rate increases and/or as the number of rows increases, the time to enable each row decreases.

BRIEF DESCRIPTION OF THE SEVERAL VIEWS OF THE DRAWING(S)

DETAILED DESCRIPTION OF THE INVENTION

Figure 1:
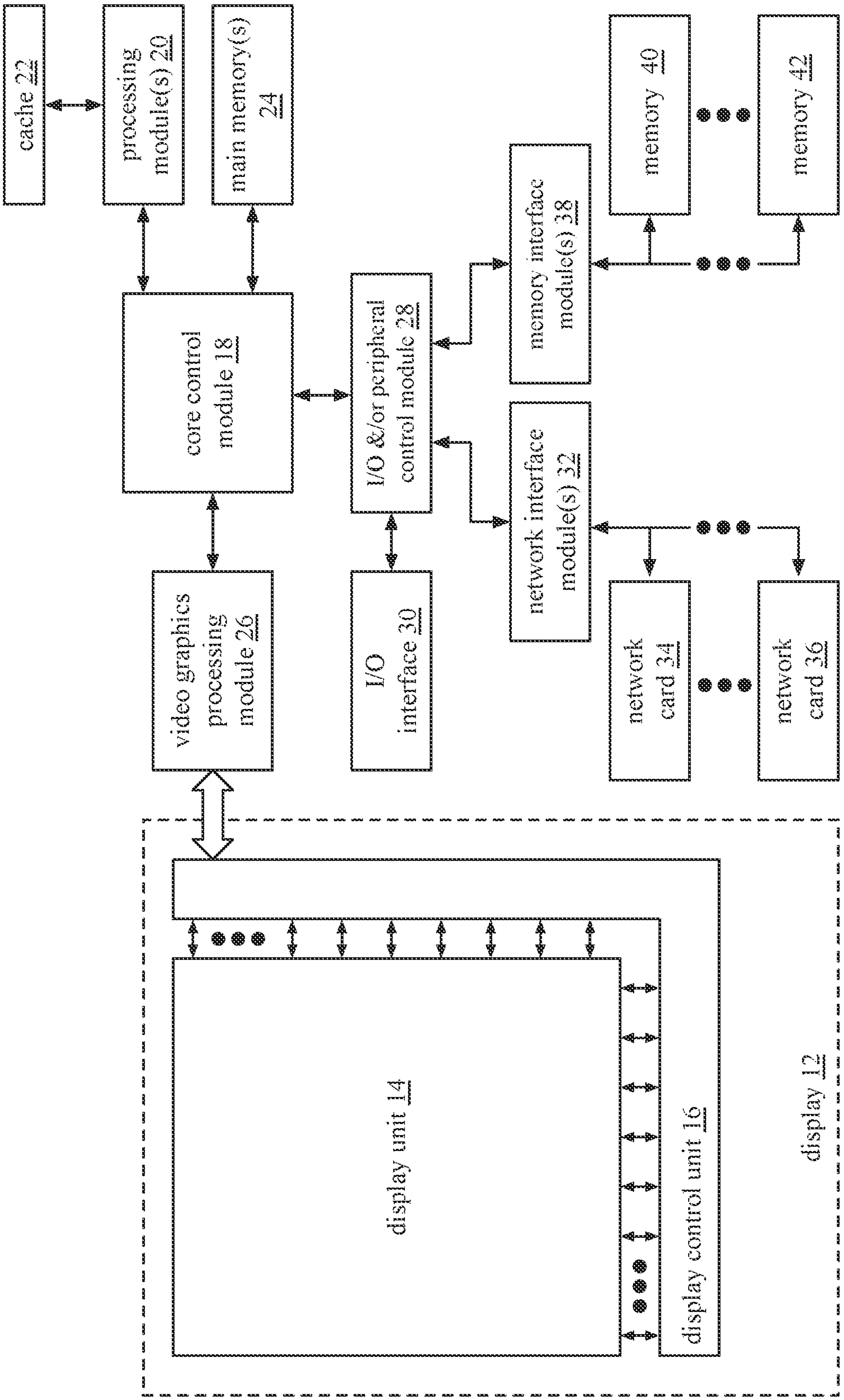
FIG. 1 is a schematic block diagram of an embodiment of a computing device in accordance with the present invention.

FIG. 1 is a schematic block diagram of an embodiment of a computing device 10 that includes a display, a core control module 18, one or more processing modules 20, one or more main memories 24 cache memory 22, a video graphics processing module 26, an Input-Output (I/O) peripheral control module 28, one or more input/output (I/O) interface modules 30, one or more network interface modules 32, and one or more memory interface modules 38. A processing module 20 is described in greater detail at the end of the detailed description of the invention section and, in an alternative embodiment, has a direction connection to the main memory 24. In an alternate embodiment, the core control module 18 and the I/O and/or peripheral control module 28 are one module, such as a chipset, a quick path interconnect (QPI), and/or an ultra-path interconnect (UPI).

The processing module 24 communicates with a video graphics processing module 26 to display data on the display 12. The video graphics processing module 26 receives data from the processing module 20, processes it to produce rendered data in accordance with the characteristics of the display 12, and provides the rendered data to the display 12. The display 12 includes an LED (light emitting diode) display, an LCD (liquid crystal display), and/or other type of display technology. The display has a resolution, an aspect ratio, and other features that affect the quality of the display.

The display 12 also includes a display unit 14 and a display control unit 16. The display control unit 16 receives data from the video graphics processing module 26 and processes it to produce data drive signals. The display control unit 16 also generates a row enable signal. The display control unit 16 provides the data drive signals and the row enable signal to the display unit 14. The row enable signal enables rows of pixel cells, on a row by row basis, to receive the data drive signals to render an image on the display unit. The image may be a frame of video data, text data, a picture, graphics, and/or a combination thereof. The display 12 will be described in greater detail with reference to one or more of FIGS. 2-23.

Each of the main memories 24 includes one or more Random Access Memory (RAM) integrated circuits, or chips. For example, a main memory 24 includes four DDR4 ($4^{th}$ generation of double data rate) RAM chips, each running at a rate of 2,400 MHz. In general, the main memory 24 stores data and operational instructions most relevant for the processing module 20. For example, the core control module 18 coordinates the transfer of data and/or operational instructions from the main memory 24 and the memory 40-42 via the IO and/or peripheral control module 28 and the memory interface module 38. The data and/or operational instructions retrieve from memory 40-42 are the data and/or operational instructions requested by the processing module or will most likely be needed by the processing module. When the processing module is done with the data and/or operational instructions in main memory, the core control module 18 coordinates sending updated data to the memory 40-42 for storage.

The memory 40-42 includes one or more hard drives, one or more solid state memory chips, and/or one or more other large capacity storage devices that, in comparison to cache memory and main memory devices, is/are relatively inexpensive with respect to cost per amount of data stored. The memory 40-42 is coupled to the core control module 18 via the I/O and/or peripheral control module 28 and via one or more memory interface modules 38. In an embodiment, the I/O and/or peripheral control module 28 includes one or more Peripheral Component Interface (PCI) buses to which peripheral components connect to the core control module 18. A memory interface module 38 includes a software driver and a hardware connector for coupling a memory device to the I/O and/or peripheral control module 28. For example, a memory interface 38 is in accordance with a Serial Advanced Technology Attachment (SATA) port.

The core control module 18 coordinates data communications between the processing module(s) 20 and a network (e.g., a local area network, a wide area network, a cellular telephone network, a data network, the internet, etc.) via the I/O and/or peripheral control module 28, the network interface module(s) 32, and a network card 34 or 36. A network card 34 or 36 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. The network interface module 32 includes a software driver and a hardware connector for coupling the network card to the I/O and/or peripheral control module 28. For example, the network interface module 32 is in accordance with one or more versions of IEEE 802.11, cellular telephone protocols, 10/100/1000 Gigabit LAN protocols, etc.

The core control module 18 coordinates data communications from input devices (e.g., a keyboard, a keypad, a microphone, a touch screen of the display 12, camera, etc.) to the processing module(s) 20 via the IO interface module 30 and the I/O and/or peripheral control module 28. An input portion of the IO interface module 30 includes a software driver and a hardware connector for coupling an input device to the I/O and/or peripheral control module 28. In an embodiment, an input portion of the IO interface module 30 is in accordance with one or more Universal Serial Bus (USB) protocols.

The core control module 40 also coordinates data communications from the processing module(s) 20 to output device(s) via the IO interface module 30 and the I/O and/or peripheral control module 28. An output device includes a speaker, actuators, lights, etc. An output portion of the IO module 30 includes a software driver and a hardware connector for coupling an output device to the I/O and/or peripheral control module 28. In an embodiment, an output portion of the IO interface module 30 is in accordance with one or more audio codec protocols.

When the display 12 includes a touch screen feature, it further includes a plurality of sensors, a plurality of drive-sense circuits (DSC), and a touch screen processing module. In general, the sensors (e.g., electrodes, capacitor sensing cells, capacitor sensors, inductive sensor, etc.) detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module, which may be a separate processing module or integrated into the processing module.

The touch screen processing module processes the representative signals from the drive-sense circuits (DSC) to determine the location of the touch(es). This information is inputted to the processing module 20 for processing as an input. For example, a touch represents a selection of a button on screen, a scroll function, a zoom in-out function, etc.

Figure 2:
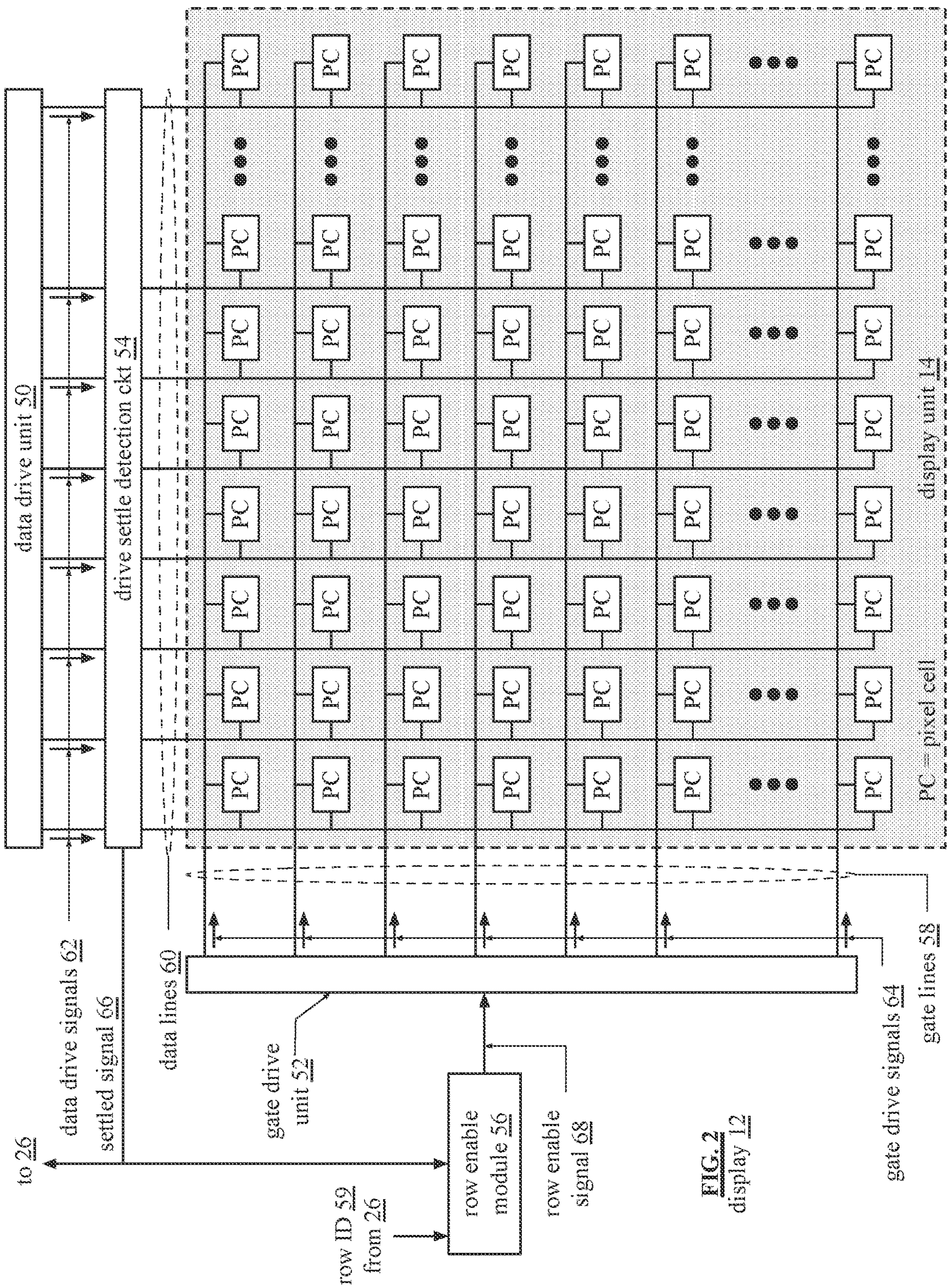
FIG. 2 is a schematic block diagram of an embodiment of a display unit and display control unit in accordance with the present invention.

FIG. 2 is a schematic block diagram of an embodiment of a display 12 that includes a display unit 14 and display control unit 16. The display control unit 16 includes a data drive unit 50, a gate drive unit 52, a drive settle detection circuit 54, and a row enable module 56. The display unit 12 includes data lines 60, gate lines 58, and pixel cells (PC). The data lines 60 and gate lines 58 are metal traces, or wires, positioned within the display unit to carry signals to the pixel cells (PC). The pixel cells include sub-pixel LCD (liquid crystal display) cells, sub-pixel LED (light emitting diode) cells, sub-pixel OLED (organic LED) cells, or other display technology cells. In general, a pixel cell includes three sub-pixel cells: a red sub-pixel cell, a green sub-pixel cell, and blue sub-pixel cell.

In an example, the video graphics processing module 26 provides digital display data for a row of pixel cells (PC) to the data drive unit 50 and provides a row identifier (ID) 59 to the row enable module 56. The row enable module 56 generates a row enable signal 68 based on the row ID 59. The gate drive unit 52 generates a gate drive signal 64 to enable one of the rows of pixel cells (PC) based on the row enable signal 68. The other rows of pixel cells (PC) remain inactive.

The data drive unit 50 generates data drive signals 62 from the digital display data and provides the data drive signals 62 to the drive settle detection circuit 54. For the enabled row (i.e., the row that is receiving the gate drive signal via the activated gate line), the drive settle detection circuit 54 monitors a set (e.g., one or more) of the data drive signals 62 for each of them to reach corresponding settling threshold. When each drive signal of the set of drive signals reach the corresponding settling threshold, the drive settle detection circuit 54 set a settled signal 66 for the activated gate line (e.g., the enabled row of pixel cells).

The drive settle detection circuit 54 sends the settled signal 66 to the row enable module 56 and to the video graphics processing module 26. The video graphics processing module 26 provides new digital display data for the next row of pixel cells and provides the ID 59 of the new row to the row enable module 56. The row enable module 56 changes the row enable signal 68 by ending the enablement of the currently activated row of pixel cells (PC) (i.e., the activated gate line). In addition, the row enable module 56 changes the row enable signal 68 to enable the new row of pixel cells to be activated by the gate drive unit 52 and the process repeats for the new row of pixel cells. When the drive settle detection circuit 54 generates the settled signal 66 for the new row of pixel cells, the process repeats for another new row of pixel cells. When the last row of pixel cells is processed, the process repeats with the first row of pixel cells.

Figure 3:
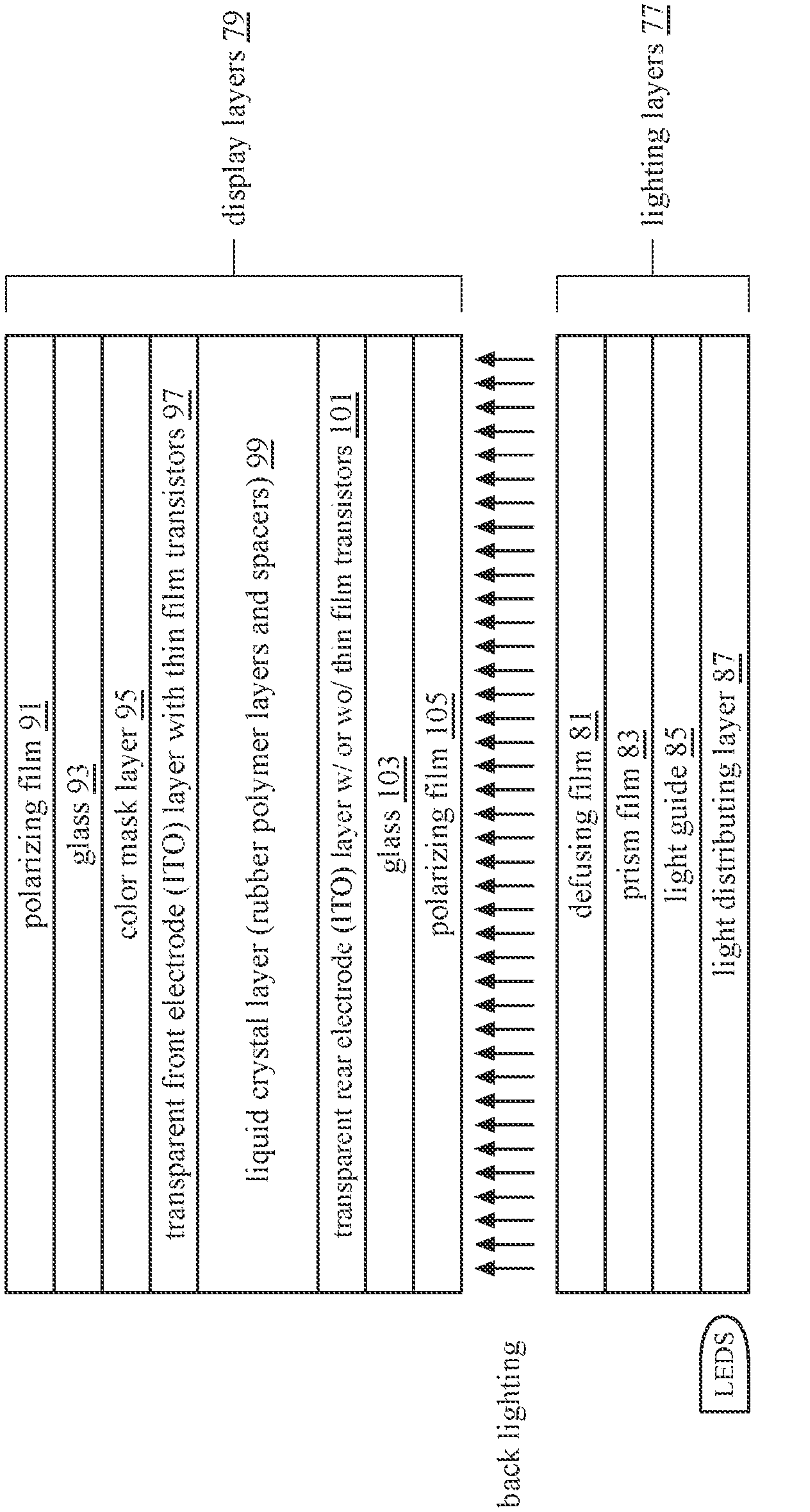
FIG. 3 is a diagram of an embodiment of a display in accordance with the present invention.

FIG. 3 is a diagram of an embodiment of an LCD display 12 that includes lighting layers 77 and display layers 79. The lighting layers 77 include a light distributing layer 87, a light guide layer 85, a prism film layer 83, and a defusing film layer 81. The display layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, and a front polarizing film layer 91. Note that one or more protective layers may be applied over the polarizing film layer 91.

In an example of operation, a row of LEDs (light emitted diodes) projects light into the light distributing player 87, which projects the light towards the light guide 85. The light guide includes a plurality of holes that lets some light components pass at differing angles. The prism film layer 83 increases perpendicularity of the light components, which are then defused by the defusing film layer 81 to provide a substantially even back lighting for the display layers 79.

The two polarizing film layers 105 and 91 are orientated to block the light (i.e., provide black light). The front and rear electrode layers 97 and 101 provide an electric field at a sub-pixel level to orientate liquid crystals in the liquid crystal layer 99 to twist the light. When the electric field is off, or is very low, the liquid crystals are orientated in a first manner (e.g., end-to-end) that does not twist the light, thus, for the sub-pixel, the two polarizing film layers 105 and 91 are blocking the light. As the electric field is increased, the orientation of the liquid crystals change such that the two polarizing film layers 105 and 91 pass the light (e.g., white light). When the liquid crystals are in a second orientation (e.g., side by side), intensity of the light is at its highest point.

The color mask layer 95 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55% blue component.

If the display 12 includes in-cell touch sensors, the in-cell touch sense functions uses the existing layers of the display layers 79 to provide capacitance-based sensors. For instance, one or more of the transparent front and rear electrode layers 97 and 101 are used to provide row electrodes and column electrodes. The row and column electrodes provide a grid that allows for self-capacitance and/or mutual-capacitance detection. When a finger touches the screen, the self-capacitance of the electrodes being touched increases and the mutual capacitance of the electrodes being touched decreases. The change in self and/or mutual capacitance is detected to determine the position of the touch.

Figure 4:
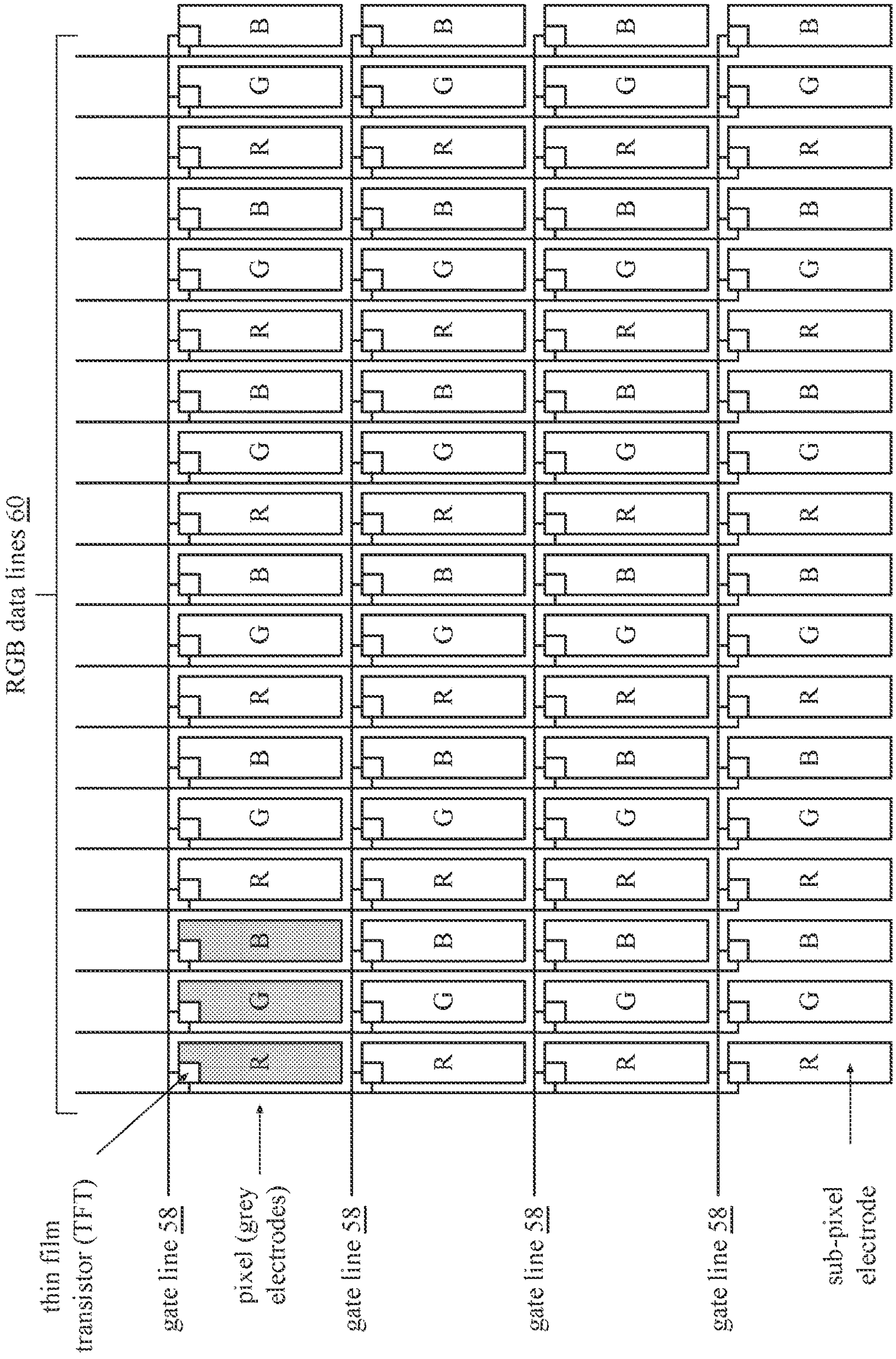
FIG. 4 is a schematic block diagram of an embodiment of an ITO layer of a display in accordance with the present invention.

FIG. 4 is a schematic block diagram of an embodiment of an ITO layer (e.g., a transparent electrode layer) 97 with thin film transistors (TFT) of a display. Sub-pixel electrodes are formed on the transparent electrode layer and each sub-pixel electrode is coupled to a thin film transistor (TFT). Three sub-pixels (R-red, G-green, and B-blue) form a pixel. The gates of the TFTs associated with a row of sub-electrodes are coupled to a common gate line 58. In this example, each of the four rows has its own gate line 58. The drains (or sources) of the TFTs associated with a column of sub-electrodes are coupled to a common R, B, or G data line 60. The sources (or drains) of the TFTs are coupled to its corresponding sub-electrode, or ground plane.

In an example of operation, one gate line 58 is activated at a time and RGB data for each pixel of the corresponding row is placed on the RGB data lines 60. At the next time interval, another gate line is activated and the RGB data for the pixels of that row is placed on the RGB data lines 60. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals and keeps the desired color of the pixel until it is refreshed.

Figure 5:
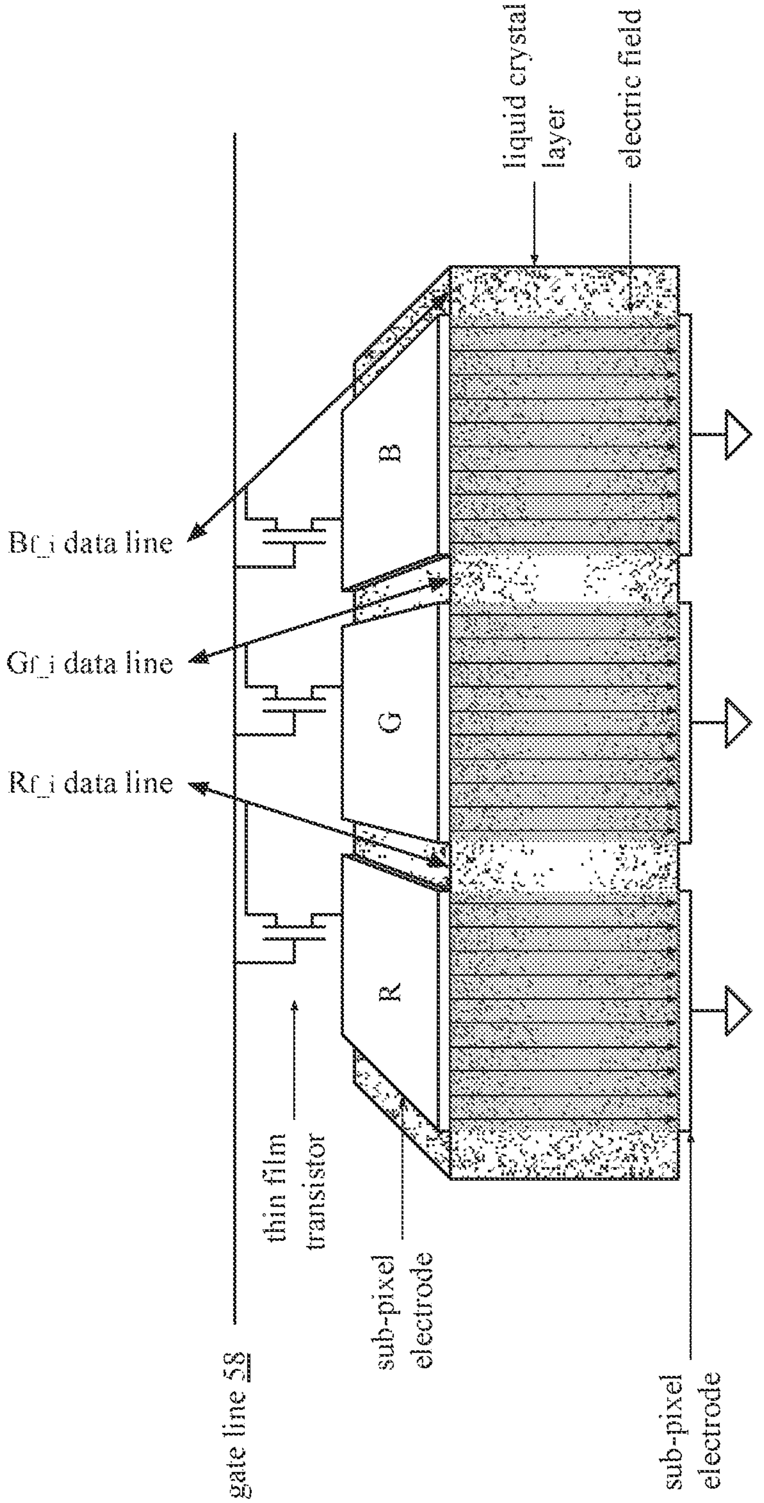
FIG. 5 is a schematic block diagram of an example of a pixel of display in accordance with the present invention.

FIG. 5 is a schematic block diagram of an example of pixel with three sub-pixels (R-red, G-green, and B-blue). In this example, the front sub-pixel electrodes are formed in the transparent conductor layer 97 and the rear sub-pixel electrodes are formed in the rear transparent conductor layer 101. Each front sub-pixel electrode is coupled to a corresponding thin film transistor. The thin film transistors coupled to the top sub-pixel electrodes are coupled to a gate line 58 and to front R, G, and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the gate lines and single-ended R, G, and B data signals are applied to the R, G, and B data lines. For example, for the red (R) sub-pixel, the thin film transistors are activated by the signal on the gate lines. The electric field created by the red sub-pixel electrodes is depending on the front Red data signals.

Figure 6:
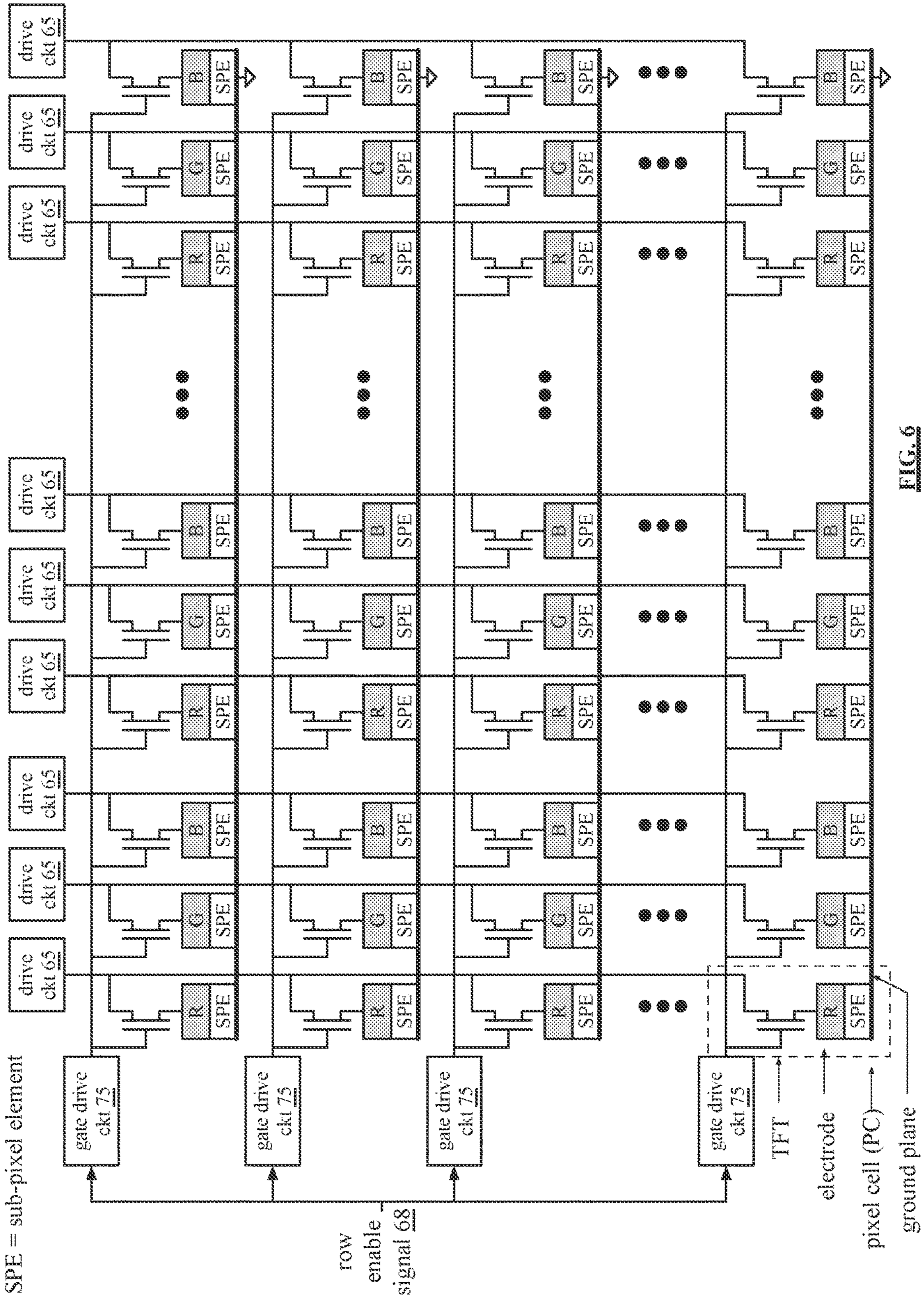
FIG. 6 is a schematic block diagram of another embodiment of a display unit and a portion of a display control unit in accordance with the present invention.

FIG. 6 is a schematic block diagram of another embodiment of the display 12 including the display unit 14 and a portion of a display control unit 16. The portion of the display control unit 16 includes the gate drive unit 52, which includes a plurality of gate drive circuit 75, and the data drive unit 50, which includes a plurality of data drive circuits 65. The gate drive circuits 75 provide gate drive signals, on a row by row basis, to the gate lines of the display unit in accordance with the row enable signal 68. The data drive circuits 65 provides data drive signals to the data lines of the display unit based on pixel line data (i.e., the digital display data provided by the video graphics processing module 2).

The display unit further includes rows of pixel cells (PC). In this embodiment, a pixel cell includes a thin film transistor (TFT), an electrode, a sub-pixel element (SPE), and a connection to a ground plane or return electrode. The sub-pixel element may be implemented in a variety of ways. For example, the sub-pixel element is part of a liquid crystal layer. As another example, the sub-pixel element is an LED (light emitting diode). As yet another example, the sub-pixel element is an organic LED (OLED).

Figure 7:
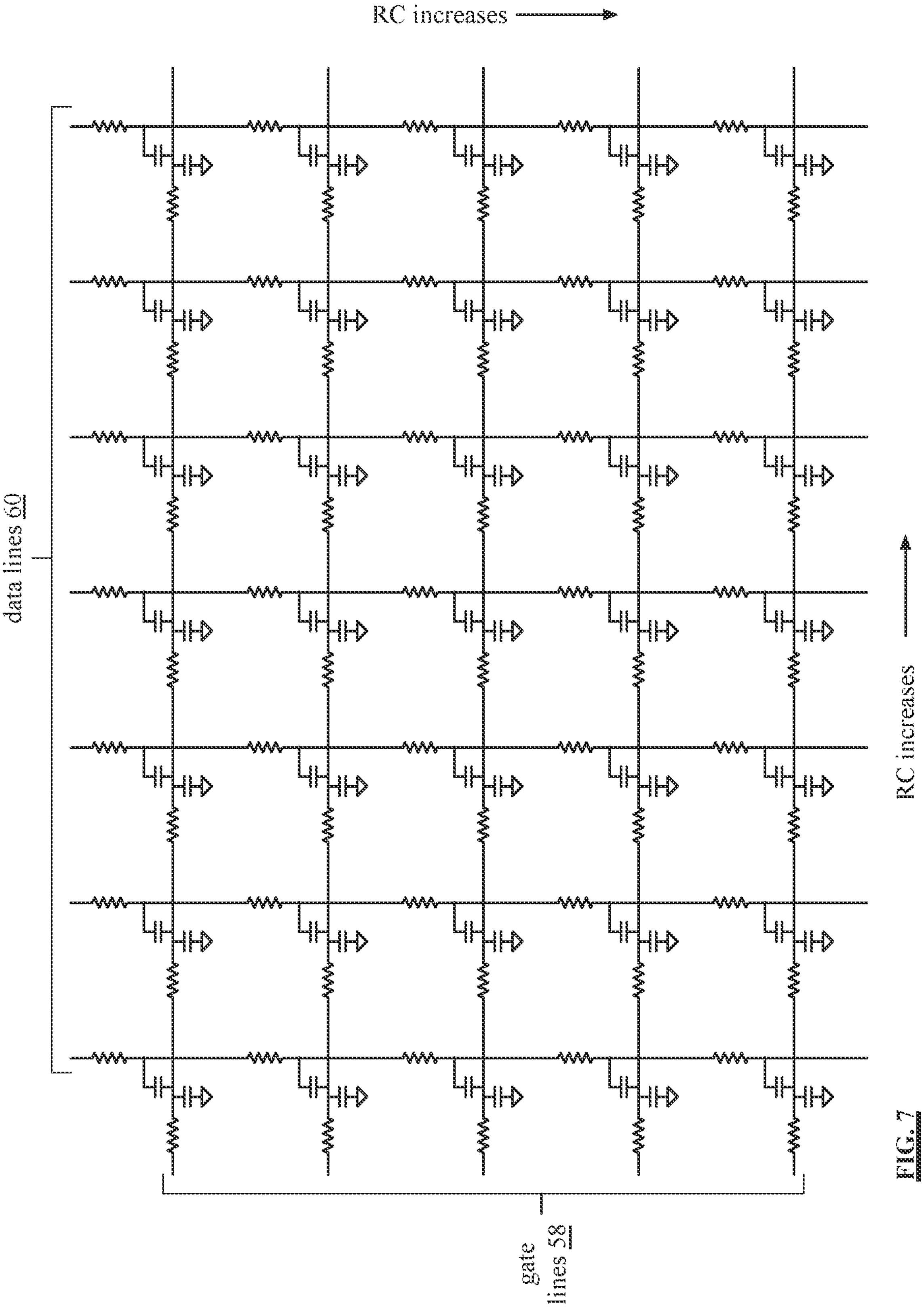
FIG. 7 is a schematic block diagram of an example of an equivalent circuit of a display in accordance with the present invention.

The combination of the data lines and the pixel cells form an RC (resistance-capacitance) network. Depending on which row (e.g., gate line) is activated, the RC network for each data line varies. For example, FIG. 7 is a schematic block diagram of an example of an equivalent circuit of a display of FIG. 6 without a gate line enabled. The PC cells are shown as RC circuits.

The gate lines couple the RC circuits in rows and the data lines coupled the RC circuit in columns. For a row, as the distance from the gate drive circuit increases, the RC time constant for that row increases. Similarly, for a column, as the distance from a data drive circuit increases, the RC time constant of that column increases. As such, the time for the signal to settle (i.e., reach a desired threshold of 0.60 to 0.95 of the inputted voltage) increases as the RC time constant increases.

Figure 8:
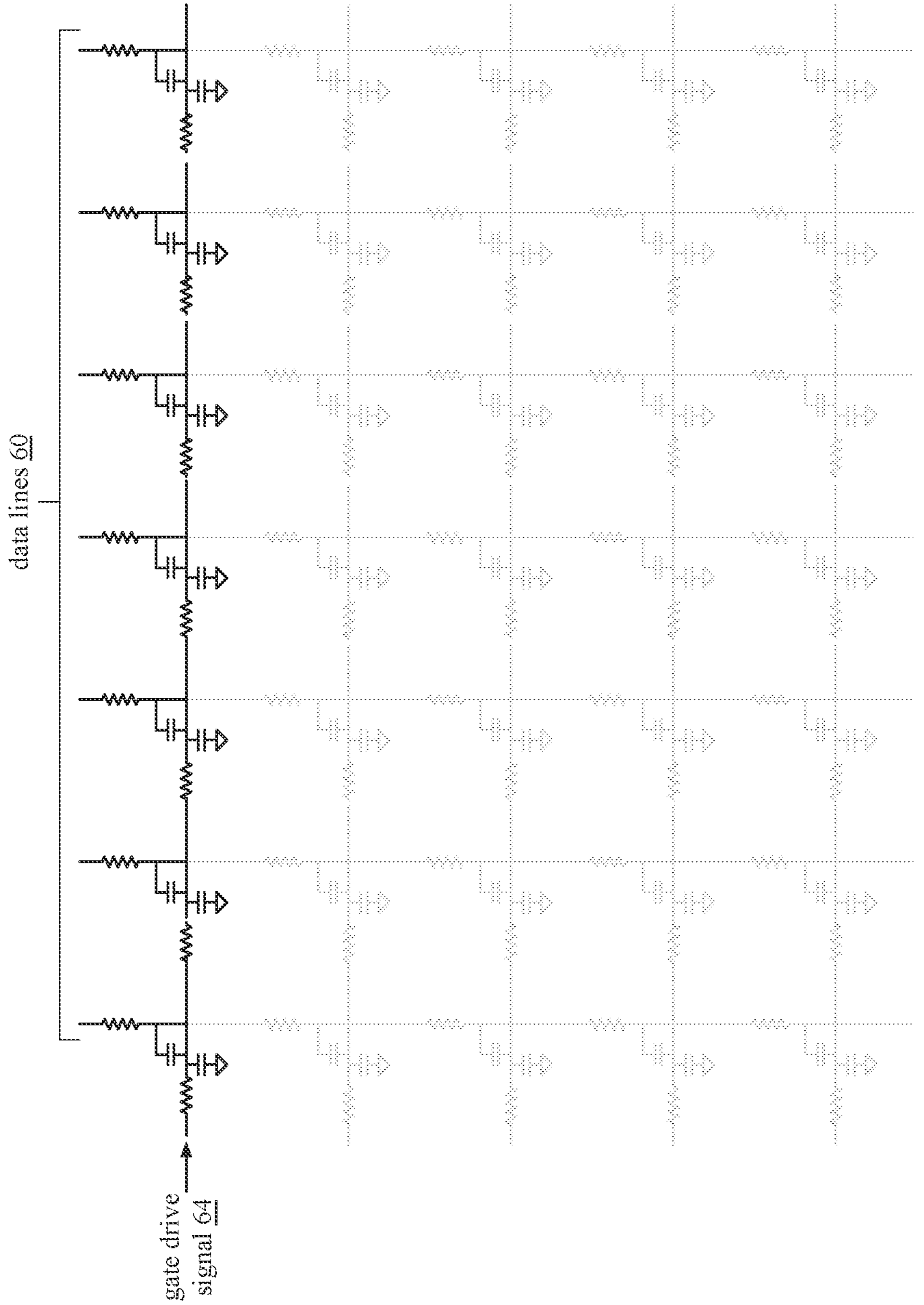
FIG. 8 is a schematic block diagram of another example of an equivalent circuit of a display with a gate line enabled in accordance with the present invention.

FIG. 8 is a schematic block diagram of another example of an equivalent circuit of a display of FIG. 7 with a first gate line enabled. In this example, the RC time constant for the columns (which corresponds to the RC network coupled to each data line) is relatively small since it only includes one row of pixel cells. With the first row of pixel cells activated, the current of the data drive signals is shunted through the first row and, thus, the remaining rows have negligible effect on the first row.

Figure 9:
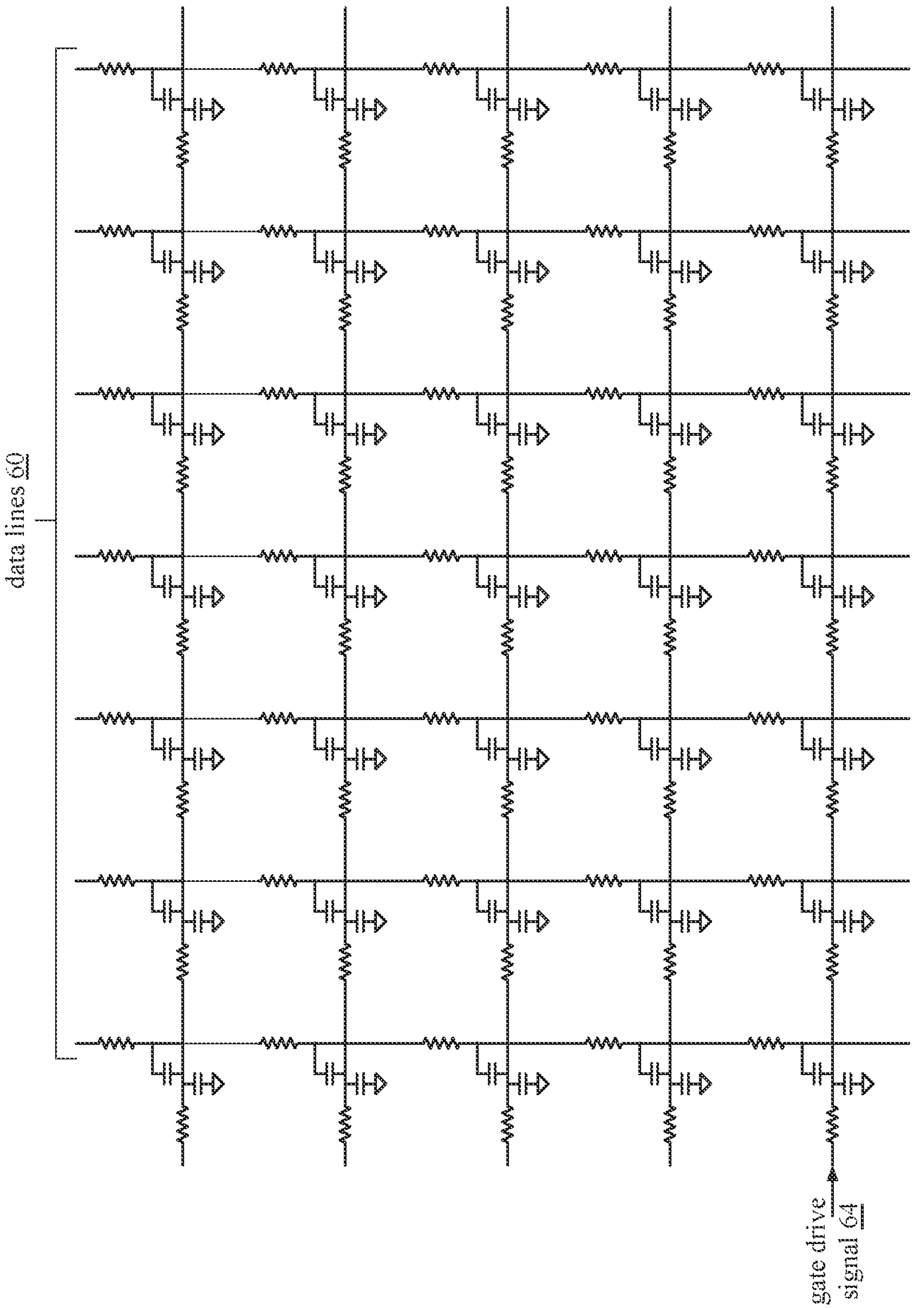
FIG. 9 is a schematic block diagram of another example of an equivalent circuit of a display with another gate line enabled in accordance with the present invention.

FIG. 9 is a schematic block diagram of another example of an equivalent circuit of a display of FIG. 7 with the last gate line enabled. In this example, the RC time constant for the columns is relatively large since it includes all of the rows of pixel cells. With the last row of pixel cells activated, the current of the data drive signals is shunted through the last row and, thus, the equivalent circuits of the remaining rows have an effect on the last row's RC time constant.

Figure 10:
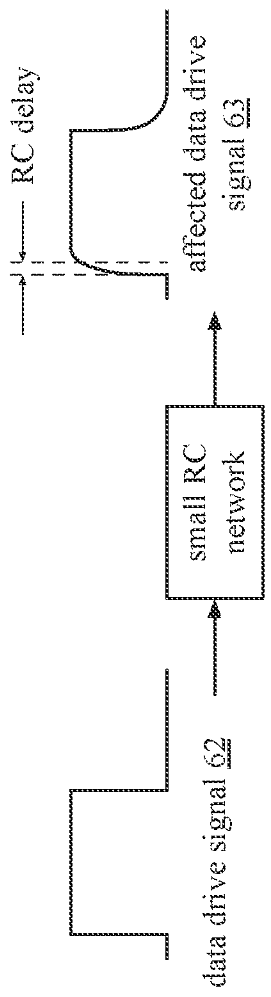
FIG. 10 is a schematic block diagram of an example of a small RC network affecting a data drive signal in accordance with the present invention.

FIG. 10 is a schematic block diagram of an example of a small RC network of FIG. 8 affecting a data drive signal 62. In this example, the data drive signal 62 is a square pulse signal having a magnitude that corresponds to the digital data for the sub-pixel. The more the sub-pixel is to contribute to the color of the pixel, the larger the magnitude. For the sub-pixel to be properly engaged, a threshold level of the data drive signal needs to be applied. The threshold level is in the range of 60% to almost 100% of the magnitude of the data drive signal. Since a small RC network has a correspondingly small RC time constant, the delay caused by it is relatively small.

Figure 11:
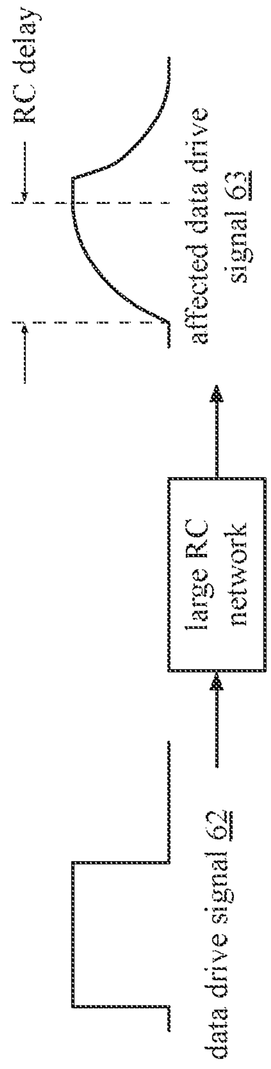
FIG. 11 is a schematic block diagram of an example of a large RC network affecting a data drive signal in accordance with the present invention.

FIG. 11 is a schematic block diagram of an example of a large RC network affecting a data drive signal 62 being affected by a large RC network of FIG. 9. In this example, the delay caused by the RC time constant is significant and most of the time the data drive signal 62 is enabled is spent charging the RC network.

As a specific example, with a display having 1080 gate lines, 3×1920 data lines, and a refresh rate of 60 Hz, a data drive signal can be enabled for 15.4 micro-seconds (assuming equal distribution). Since it takes approximately 5 RC time constants to substantially charge the capacitance, the largest RC time constant has to be less than about 3 micro-seconds (15.4/5). With the data lines being metal traces, their resistance should be in the range of 10 micro-Ohms to 1 milli-Ohm. Thus, the capacitance is in the range of 30 pico-Farads to 3 nano-Farads.

With the RC time constant for data drive lines of the last row being 3 micro-seconds and capacitance is in parallel is additive, the RC time constant for the data drive lines for the first row is approximately 3 nano-seconds (e.g., 3 micro-seconds divided by 1080). This is a dramatic range in RC time constants.

Figure 12:
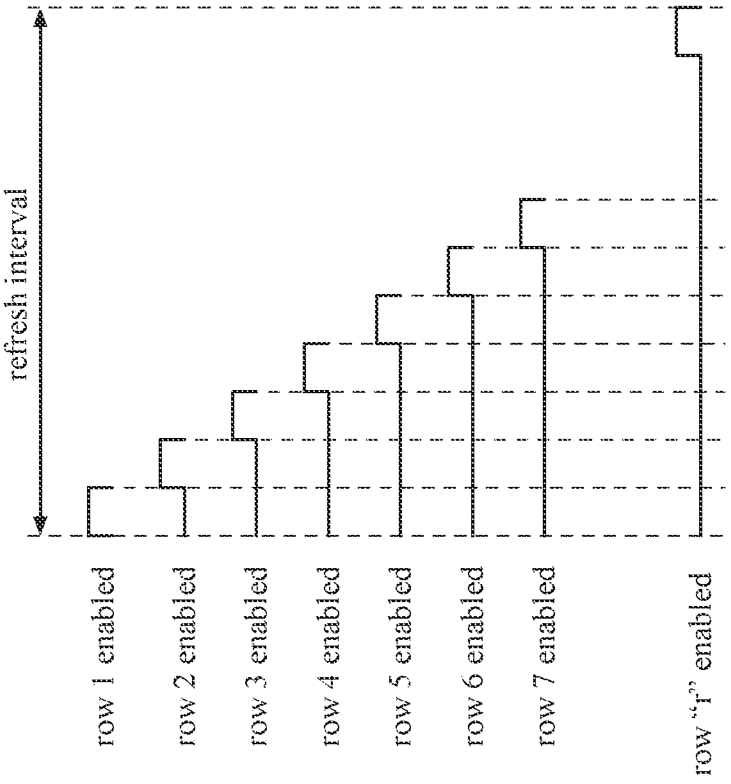
FIG. 12 is a schematic block diagram of an example of a row enable signal having equal row enablement.

FIG. 12 is a schematic block diagram of an example of a row enable signal having equal row enablement. In this example, the row enable signal includes a plurality of pulse signals; one for each row. The duration of each pulse signal is substantially the same. In many current displays, the duration of the pulse per row is based on a worst-case RC time constant (e.g., typically the RC time constant for the data drive lines when the last row is enabled). With this approach, the pixel cells of the rows further from the last row are enabled far longer than needed to achieve a charge to the pixel that will substantially last to the next refresh cycle. As such, unnecessary power is consumed, the refresh rate is limited, display performance is limited, and/or display quality is limited.

Figure 13:
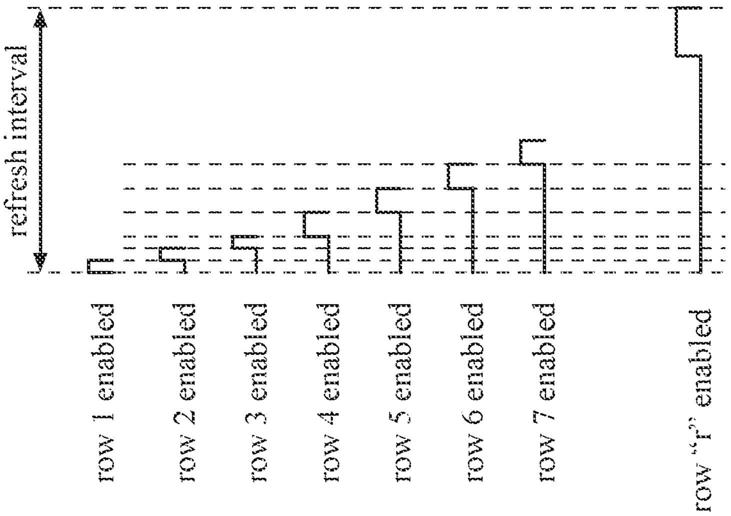
FIG. 13 is a schematic block diagram of an example of a row enable signal having unequal row enablement in accordance with the present invention.

FIG. 13 is a schematic block diagram of an example of a row enable signal having unequal row enablement in accordance with the display 12 of one or more of FIGS. 2-23. In this example, the row enable signal includes a plurality of pulse signals; one for each row, but are of different durations. The durations are set based on the RC time constant for the data drive lines for the enable row and a desired time to insure sufficient charging of the pixel cell. As such, since the RC time constant for the data drive lines is smallest when the first row is enabled, the first row enable pulse signal will be of the shortest duration. Conversely, since the RC time constant for the data drive lines is largest when the last row is enabled, the last row enable pulse signal will be of the largest duration.

This produces a significant time savings in refreshing a display. The significant time savings may be used in a variety of ways. For example, the time savings is used to reduce power consumption of the display by keeping the same refresh rate and let the display control unit sit idle between refresh cycles. As another example, the time savings is used to increase the refresh rate, thereby improving the quality of the display. As yet another example, the time savings is used to allow other functions to be executed on the display such as touch and/or tactile functions.

In another embodiment, the pulse signals for groups of rows are of the same duration. For example, the first 10 rows, the RC time constant is determined for the data lines when the first row is enable and the pulse duration is determined accordingly. This same pulse duration is used for the next nine rows. As such, the drive settle detection circuit 54 does not need to determine an RC time constant and corresponding settle indication for the data lines for each row. It can be done in groups, where one RC time constant is determined for the group the row enable pulse signal for the rows in the group have the same duration.

Figure 14:
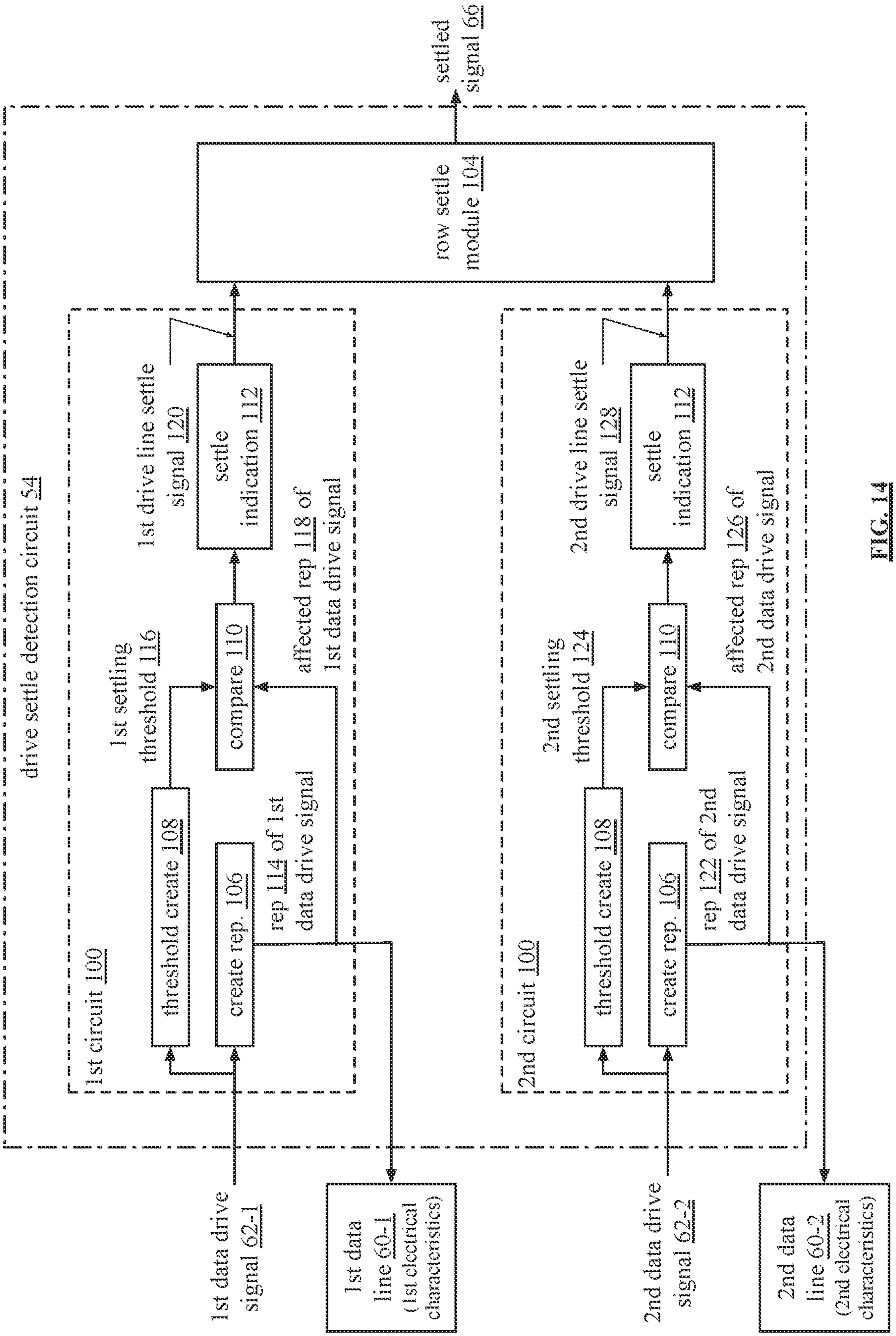
FIG. 14 is a schematic block diagram of an embodiment of a drive settle detection circuit in accordance with the present invention.

FIG. 14 is a schematic block diagram of an embodiment of a drive settle detection circuit 54 that includes a plurality of circuits 100 (two shown) and a row settle module 104. Each of the circuits 100 includes circuitry 106 for generating a representation of a data drive signal, circuitry 108 for creating a settling threshold, circuitry 110 to compare the settling threshold with the representation of the data drive signal, and circuitry 112 to indicate when the data drive line is settled. In this example, a first circuit 100 is coupled to a first data line 60-1 that includes first electrical characteristics and a second circuit 100 is coupled to a second data line 60-2 that includes second electrical characteristics. The electrical characteristics include resistance, capacitance, inductance, interference, and/or transmission line effects. The first electrical characteristics may be different than the second electrical characteristics due to different RC combinations of a row and/or different line impedances.

In an example, the first circuit 100 creates a first settling threshold 116 based on a first data drive signal 62-1. For example, the first settling threshold 116 is a magnitude scaled representation of the first data drive signal, wherein the magnitude of the first settling threshold 116 is between 60% and about 100% of the magnitude of the first data drive signal. In other aspects, the first settling threshold 116 has a waveform that is substantially similar to the waveform of the first data drive signal.

The first circuit also creates a representation 114 of the first data drive signal 62-1. For example, the representation 114 is a buffered version of the first data drive signal 62-1. As another example, the representation 114 is a current-based signal and the first data drive signal is a voltage-based signal. The first circuit 100 then drives the representation 114 of the first data drive signal onto the first data line 60-1.

Based on the electrical characteristics of the first data line 60-1, the representation 114 of the first data drive signal will be affected producing an affected representation 118 of the first data drive signal. As examples, refer to FIGS. 8-12. The first circuit 100 compares the affected representation 118 of the first data drive signal with the first settling threshold 116. When the affected representation 118 of the first data drive signal compares favorably with the first settling threshold 116, the first circuit 100 sets a first drive line settled signal 120.

The second circuit 100 operates similarly to the first circuit 100, but uses the second data drive signal 62-2 and is coupled to the second data line 60-2. As such, the second circuit 100 creates a second settling threshold 124 based on the second data drive signal 62-2 and creates a representation 122 of the second data drive signal. The second circuit drives the representation 122 of the second data drive signal onto the second data line 60-2. The electrical characteristics of the second data line affect the representation of the second data drive signal to produce an affected representation 126 of the second data drive signal. The second circuit compares the affected representation 126 of the second data drive signal with the second settling threshold 124 and, when the affected representation 126 of the second data drive signal compares favorably with the second settling threshold 124, sets a second drive line settled signal 128.

The row settle module 104 receives the drive line settled signals 120 and 128. When the drive line settled signals are set for each drive line of a row being monitored, the row settle module 104 sets the settled signal 66. When the settled signal 66 is set, it is indicative that each of the drive lines being monitored has provided its drive line signal to its pixel cell at a desired level for a desired duration.

Figure 16:
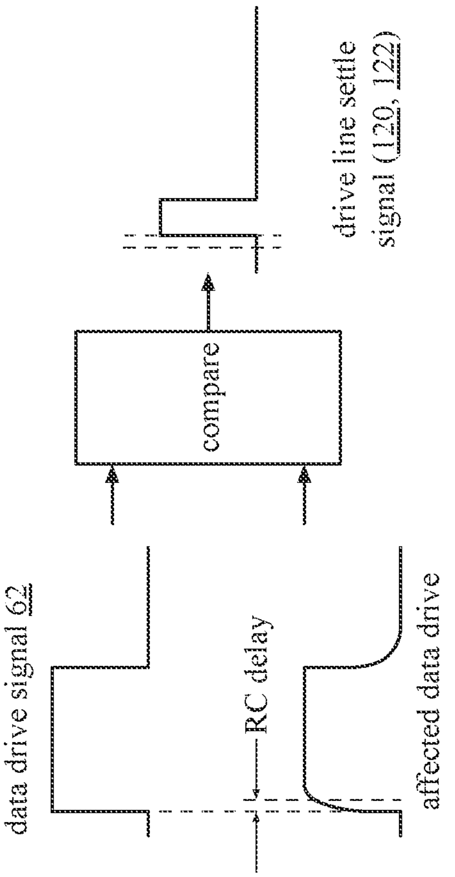
FIGS. 15-17 are schematic block diagram of examples of a circuit of a drive settle detection circuit generating drive line settle signals in accordance with the present invention.
Figure 17:
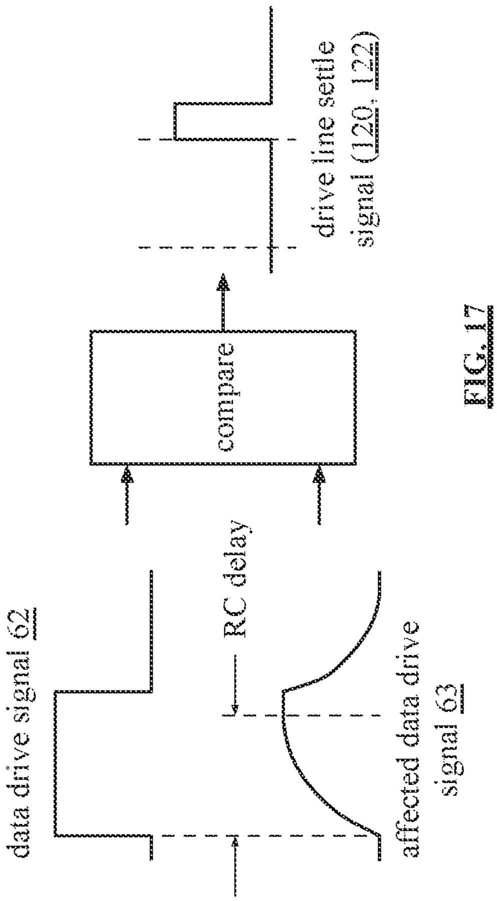
Figure 15:
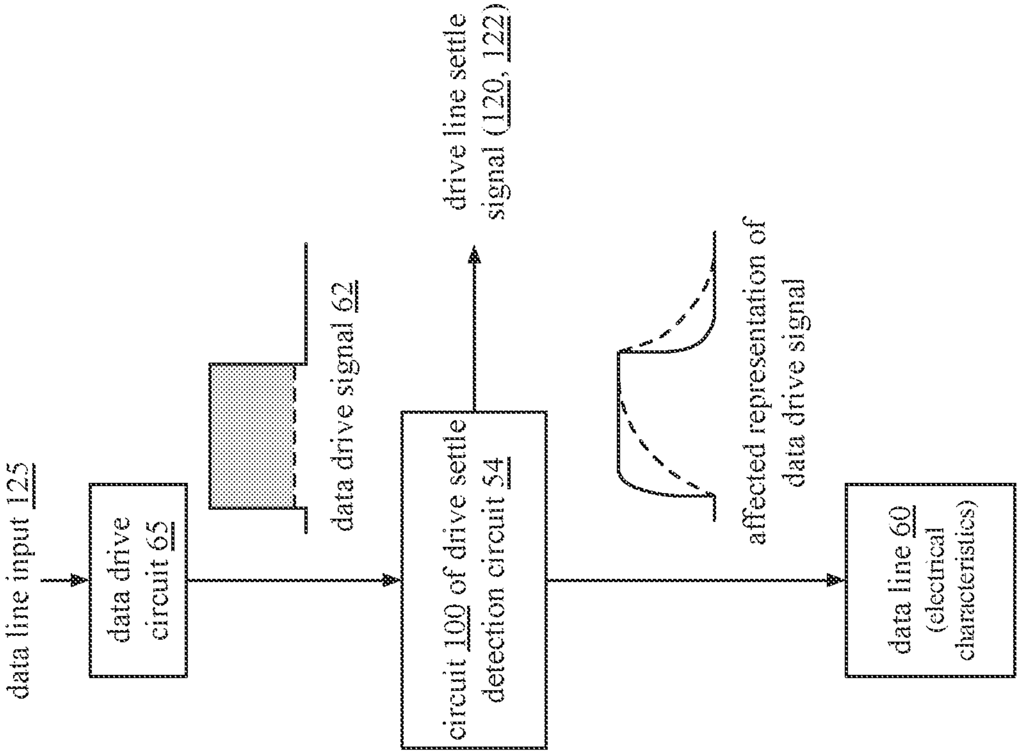

FIGS. 15-17 are schematic block diagram of examples of a circuit 100 of a drive settle detection circuit 54 generating a drive line settle signal 120 or 122. In FIG. 15, the circuit 100 is coupled to a data drive circuit 65 of the data drive unit 50 and to a corresponding data line 60. The data drive circuit 65 receive a data line input 125 (e.g., a digital value for a pixel cell) and converts it into a data drive signal 62. In general, the data drive circuit 65 includes a digital to analog circuit that converts the digital value of the data line input 125 into an analog data drive signal 62. The magnitude of the data drive signal 62 will vary based on the digital value.

The circuit 100 provides a representation of the data drive signal 62 to the data line 60. The electrical characteristics of the data line 60 affect the representation of the data drive signal producing an affected representative signal. As shown a relatively small RC network will have minimal RC delay effect on the representative signal and a relatively large RC network have a significant RC delay effect on the representative signal. When the affected representative signal settles (e.g., reaches a desired magnitude), the circuit 100 sets the drive line settled signal.

FIG. 16 illustrates a comparison between the data drive signal 62 and the affected representative signal 63 being affected by a relatively small RC network. In this example, the RC delay is small, as such the magnitude of the affected representative signal reaches the desired level quickly, which triggers the setting of the drive line settle signal 120, 122. The circuit 100 sets (e.g., places it in a logic 1 state; otherwise it is in a logic 0 state or high impedance state) the drive line settle signal 120, 122 for a fixed duration or is reset by a signal from the row enable module 56 or the row settled module 104.

FIG. 17 illustrates a comparison between the data drive signal 62 and the affected representative signal 63 being affected by a relatively large RC network. In this example, the RC delay is large, as such it takes some time for the magnitude of the affected representative signal 63 to reach the desired level, which eventually triggers the setting of the drive line settle signal 120, 122. The circuit 100 sets the drive line settle signal 120, 122 for a fixed duration or is reset by a signal from the row enable module 56 or the row settled module 104.

Figure 18:
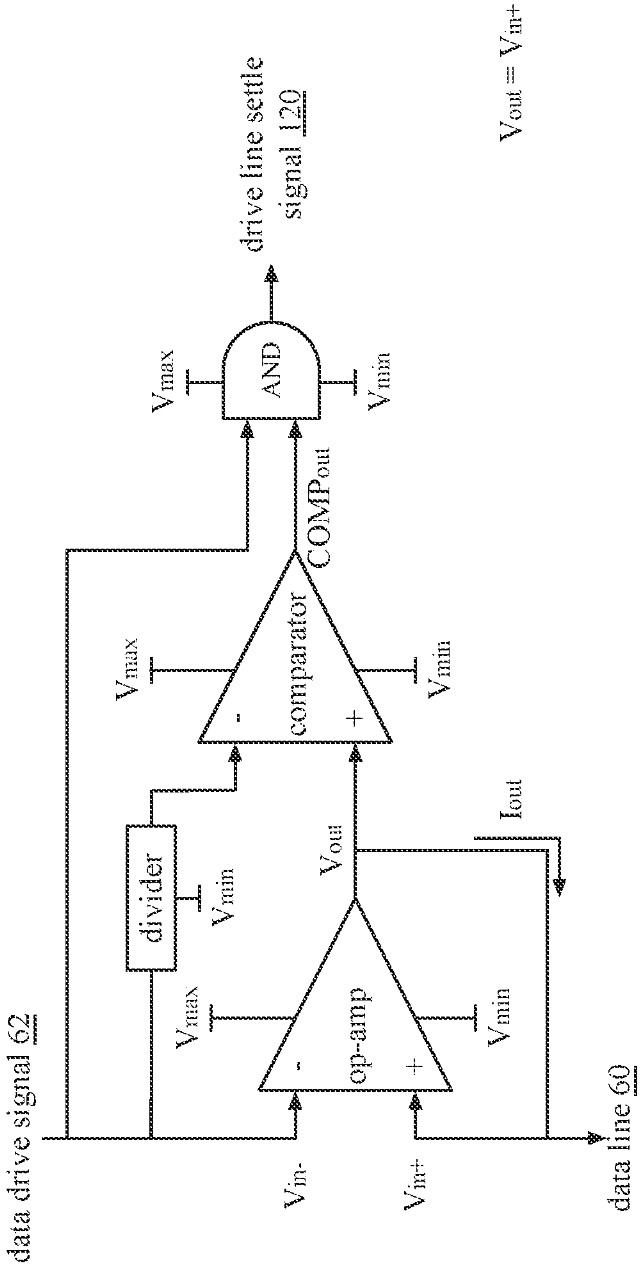
FIG. 18 is a schematic block diagram of an embodiment of a circuit of a drive settle detection circuit in accordance with the present invention.

FIG. 18 is a schematic block diagram of an embodiment of a circuit 100 of a drive settle detection circuit 54. The circuit 100 includes an operational amplifier (op-amp), a divider, a comparator, and a logic circuit (e.g., an AND gate). The operational amplifier (op-amp) includes first and second inputs (− and +) and an output. The first input receives the data drive signal 62 as a Vin (−) input and the second input receives the op-amp output as a Vin (+) input. The op-amp outputs a representation of the data drive signal 62 onto a data line 60.

The divider divides the data drive signal 62 to produce a settling threshold (e.g., a second representation of the data drive signal 62). In an embodiment, the divider is a resistive divider that divides the magnitude of the data drive signal 62 by about 0% to about 40% to produce the settling threshold (e.g., magnitude of the settling threshold is about 60% to about 100% of the magnitude of the data drive signal).

The comparator includes inputs for receiving the representation of the first data drive signal and for receiving the second representation of the first data drive signal (e.g., the settling threshold). The output of the comparator produces a comparison output (COMPout) of a comparison between the first and second representations of the data drive signal. The logic circuit (e.g., an AND gate) generates the drive line settled signal 120 based on the comparison output (COMPout) and first data drive signal 62.

In an alternate embodiment, Vmax and Vmin are at least 1.5× the magnitude of Vin+ and Vin− to reduce the RC delay for a large RC network. For example, Vmax and Vmin are increased as the row number increases. This could be done for every row or for every group of rows.

Figure 19:
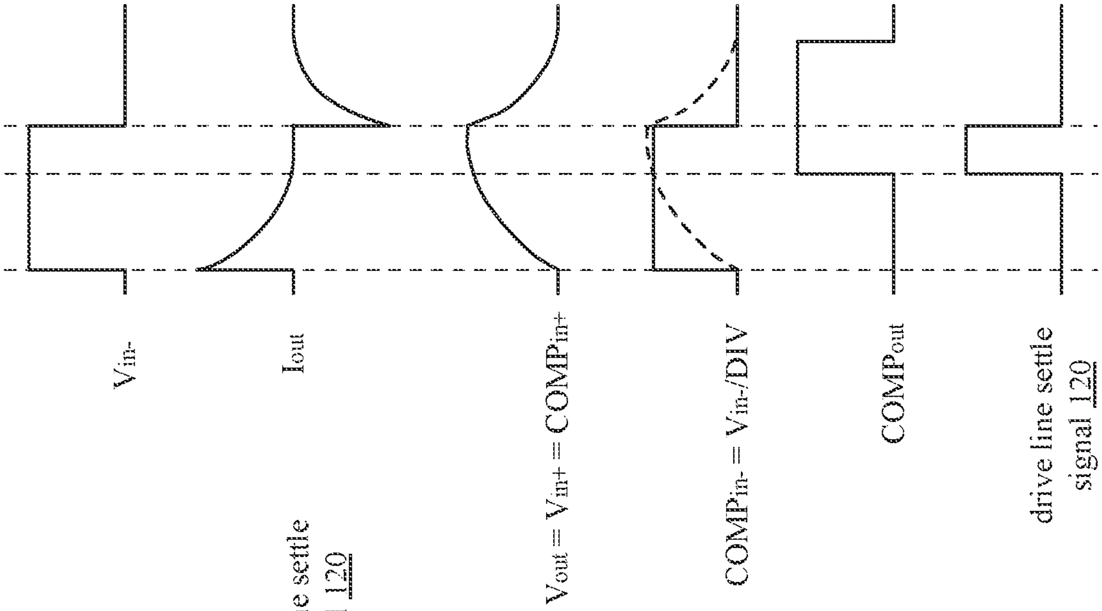
FIG. 19 is a schematic block diagram of an example of a circuit of a drive settle detection circuit generating a drive line settle signal in accordance with the present invention.

FIG. 19 is a schematic block diagram of a timing and signaling example of the circuit of FIG. 18. The timing is triggered on the leading edge of the data drive signal 62, which is received by the op-amp as the Vin (−) input. The RC network on the data line 60 and the output current (Iout) of the op-amp establish the Vin (+) input of the op-amp. Since the voltage on a capacitor cannot instantaneously change, the Vin (+) input voltage will be less than the Vin (−) input voltage, which causes the op-amp to generate a large current to rapidly charge the RC network.

As the RC network charges, the voltage on the data line (Vout=Vin (+)=COMPin+) increases. When the magnitude of the voltage on the data line reaches the magnitude of the divider output (e.g., COMPin−), the output of the comparator (COMPout) is set (e.g., transitions from a logic 0 state to a logic 1 state). The AND gate generates the drive line settle signal 120 to be in a logic 1 state when both the data drive signal 62 and the comparator output are in a logic 1 state; otherwise it is in a logic 0 state.

The duration of the drive line settle signal 120 is based on the falling edge of the data drive signal. The falling edge of the data drive signal 62 can occur as soon as the corresponding sub-pixel is sufficiently charge. The time to sufficiently charge a sub-pixel is based on the RC time constant and the previous state of the sub-pixel (e.g., the data drive signal during the previous refresh interval). If the current and previous data drive signals are substantially the same, then there is very little time needed to sufficiently charge the sub-pixel. As such, the duration of the drive line settle signal 120 can be very short (e.g., a micro-second or less).

Figure 20:
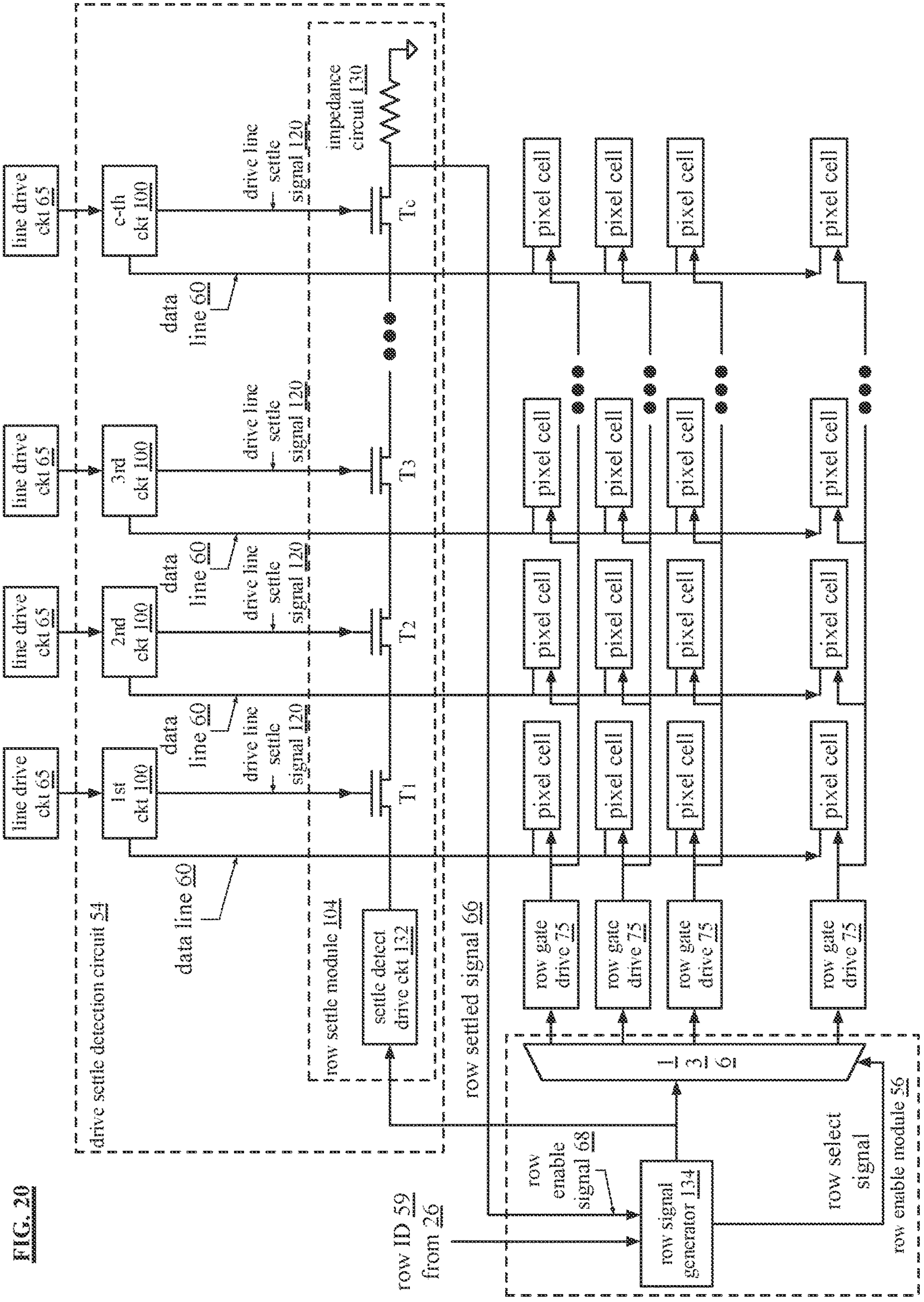
FIG. 20 is a schematic block diagram of an embodiment of a row settle module of a drive settle detection circuit and of a row enable module in accordance with the present invention.

FIG. 20 is a schematic block diagram of an embodiment of a row settle module 104 of a drive settle detection circuit 54 and of a row enable module 56. The drive circuit detection circuit 54 is further shown to include a plurality of circuits 100 coupled to line drive circuit 65 of the data drive unit 50. The circuits 100 provide the data drive signals onto the respective data drive lines 60 and provides the data line settle signal 120 to the row settle module 104.

The row settle module 104 includes transistors T1-Tc, an impedance circuit 130, and a settle detect drive circuit 132. The settle detect drive circuit 132 receives the row enable signal 68. When the row enable signal 68 is set (e.g., in a logic 1 state), the settle detect drive circuit 132 provides a voltage (e.g., a settle detect drive signal) to the series connected transistors.

The gates of the transistors are coupled to receive the drive line settled signals 120. When a drive line settle signal 120 is set (e.g., in a logic 1 state), the corresponding transistor is turned on (e.g., acting like a short) and when the drive line settle signal 120 is not set (e.g., in a logic 0 state), the corresponding transistor is off (e.g., acting like an open circuit). When the settle detect drive signal is present and all of the transistors are turned on, a voltage is applied to the impedance circuit 130 (e.g., a resistor having a resistance much greater than the on-resistance of the transistors), which produces the row settled signal 66. Thus, when all of the drive line settled signals 120 are set for a row of pixel cells, the row settle module 104 generates the row settled signal 66.

The row enable module 56 includes a row signal generator 134 and a selection circuit 136. The row signal generator 134 receives the row settled signal 66 and the row ID 59 from the video graphics processing module 26. The row signal generator 134 generates a row enable pulse signal as part of the row enable signal 68 based on the row ID 59 and the row settled signal 66. In particular, the row signal generator 134 creates the rising edge of the row enable pulse signal to correspond with receiving the row ID 59 for a new row and creates the falling edge of the row enable pulse signal to correspond with receiving the row settled signal 66.

The selection circuit 136 (e.g., a switch network, a de-multiplexer, etc.) receives row selection signal from the row signal generator 134 to select which row gate drive 75 of the gate drive unit 52 will receive the currently created row enable pulse signal of the row enable signal 68. For instance, the row signal generator 134 generates the row selection signal based on the row ID 59. In an alternate embodiment, the section circuit 134 receives the row ID 59 directly.

Figure 21:
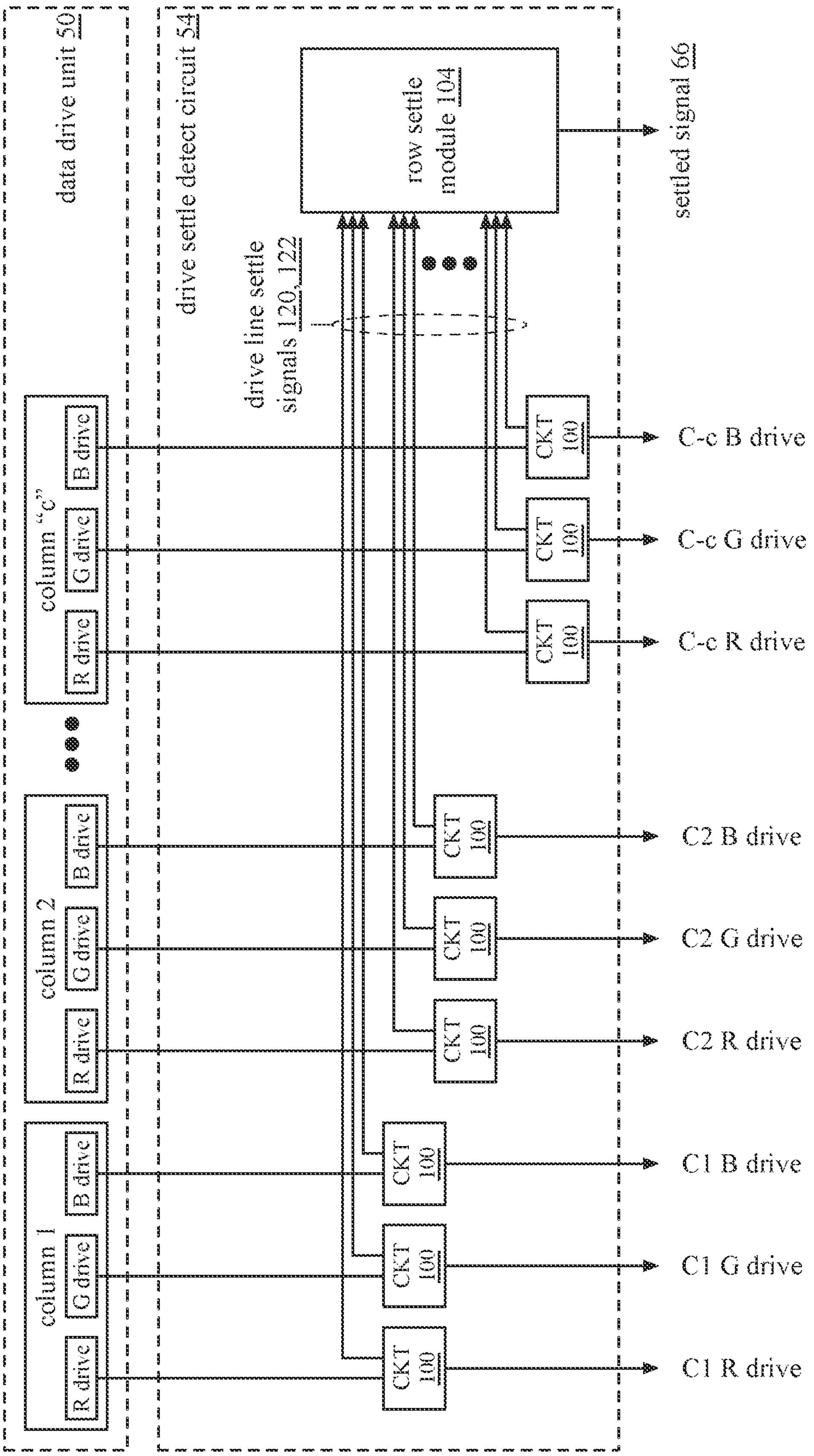
FIG. 21 is a schematic block diagram of an example of a drive settle detection circuit sensing all or almost all of the drive lines in accordance with the present invention.

FIG. 21 is a schematic block diagram of an example of a drive settle detection circuit 54 coupled to the data drive unit 50. The data drive unit 50 includes a plurality of data drive circuits (e.g., Red drive, Green drive, and Blue drive) for each column of pixels. The data drive unit 50 includes “c” columns (e.g., 1920) of R, G, B data drive circuits. In this embodiment, the drive settle detect circuit 54 includes a plurality of circuits 100, where there is a circuit 100 for each of the data drive circuits. As such, each data line is being sensed for when it is settled. While each data line is being sensed, not every row of pixel cells needs to be sensed. For example, every $10^{th}$ row may be sensed.

Figure 22:
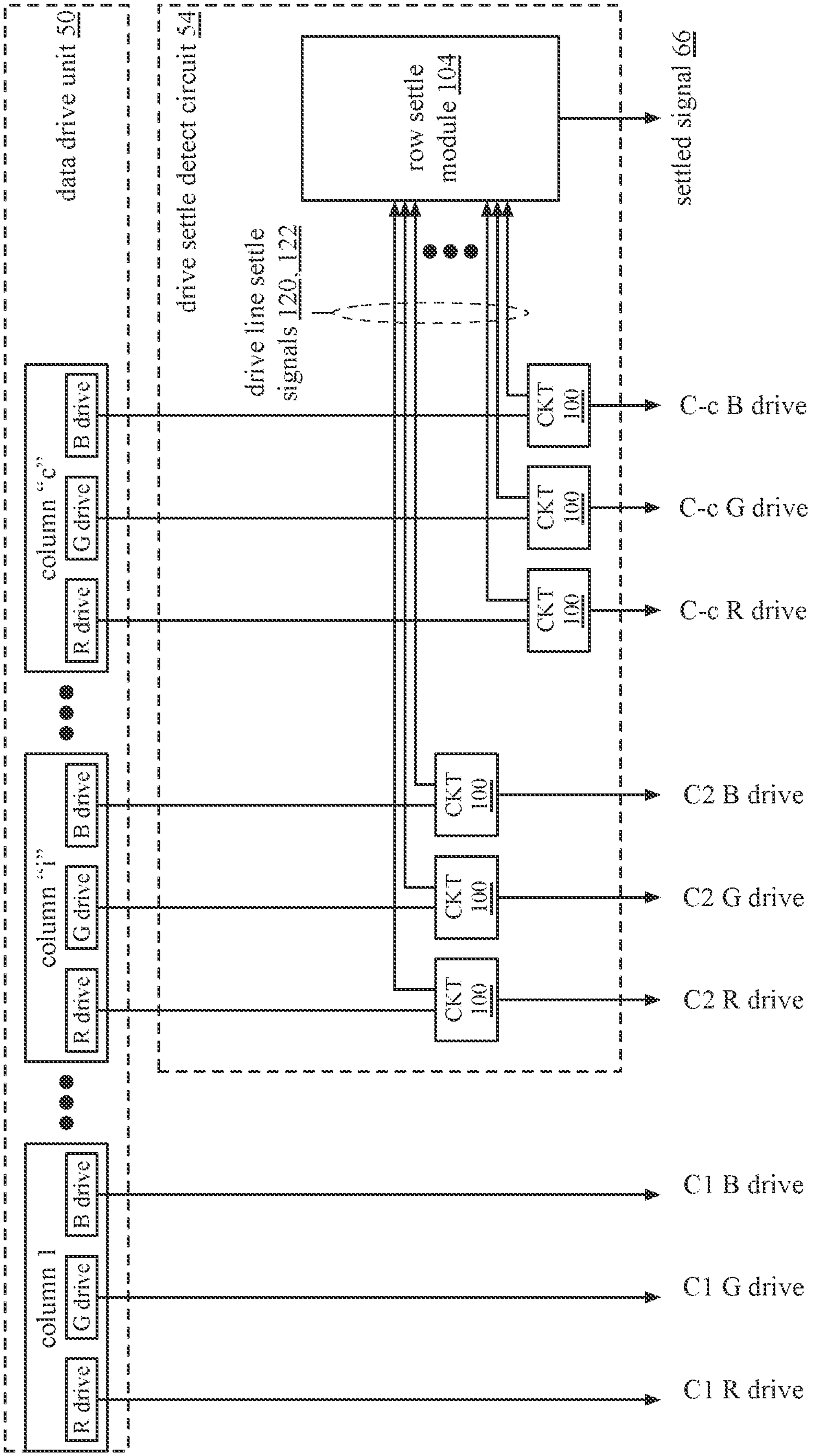
FIG. 22 is a schematic block diagram of an example of a drive settle detection circuit sensing some of the drive lines in accordance with the present invention.

FIG. 22 is a schematic block diagram of an example of a drive settle detection circuit 54 coupled to the data drive unit 50. The data drive unit 50 includes a plurality of data drive circuits (e.g., Red drive, Green drive, and Blue drive) for each column of pixels. The data drive unit 50 includes “c” columns (e.g., 1920) of R, G, B data drive circuits. In this embodiment, the drive settle detect circuit 54 includes 100, but not for each of the data drive circuits. For example, selected columns have corresponding circuits 100. In this manner, only some of data drive lines are being sensed. In addition, not every row of pixel cells needs to be sensed. For example, every $10^{th}$ row may be sensed.

Figure 23:
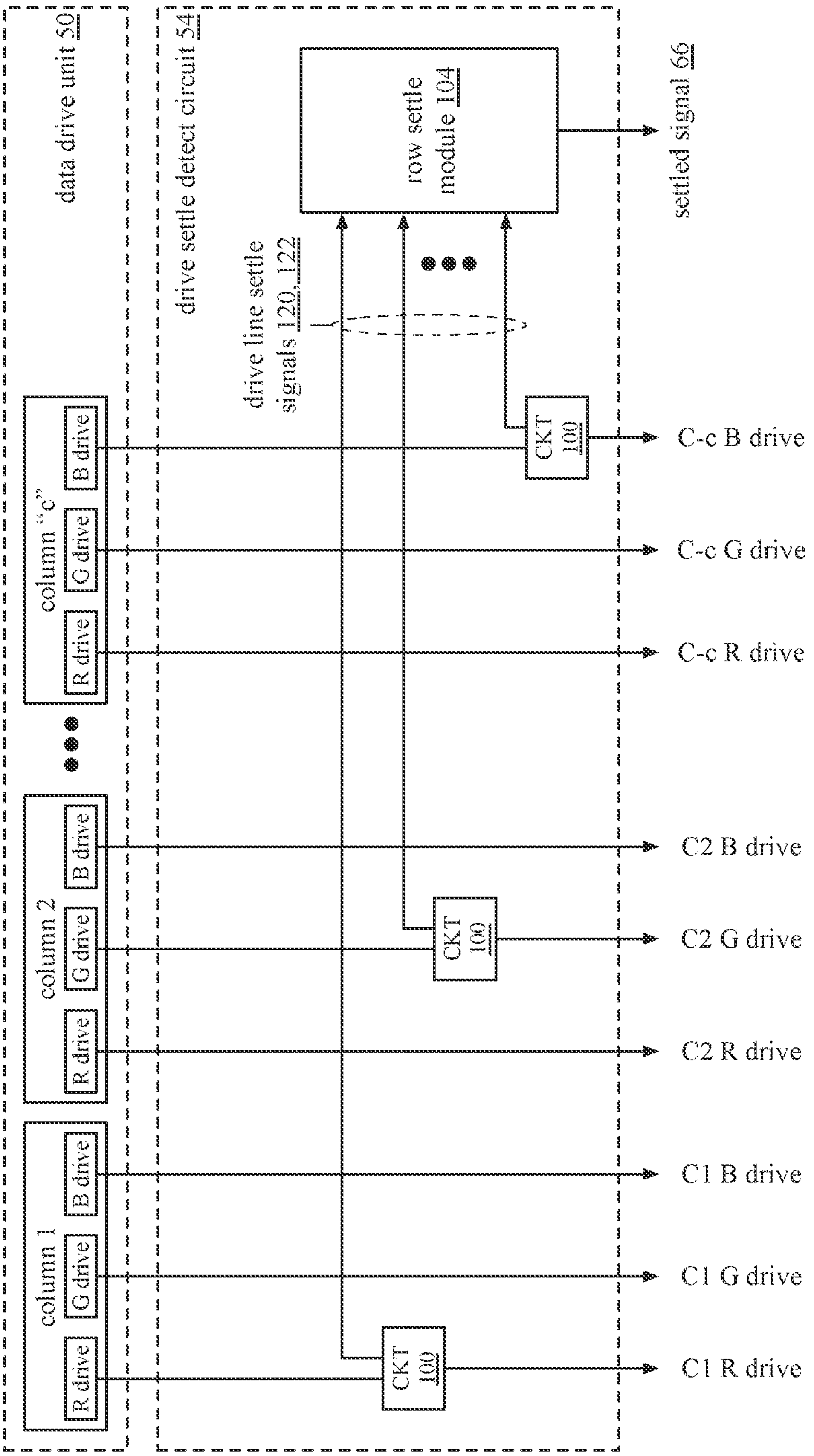
FIG. 23 is a schematic block diagram of another example of a drive settle detection circuit sensing some of the drive lines in accordance with the present invention.

FIG. 23 is a schematic block diagram of another example of a drive settle detection circuit 54 coupled to the data drive unit 50. The data drive unit 50 includes a plurality of data drive circuits (e.g., Red drive, Green drive, and Blue drive) for each column of pixels. The data drive unit 50 includes “c” columns (e.g., 1920) of R, G, B data drive circuits. In this embodiment, the drive settle detect circuit 54 includes 100, but only one for each column of the data drive circuits. For example, selected drive circuits of the columns have a corresponding circuit 100. In this manner, only some of data drive lines are being sensed. In addition, not every row of pixel cells needs to be sensed. For example, every $10^{th}$ row may be sensed.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A display control unit comprises:

a data drive unit, when operable, generates a plurality of data drive signals for driving a plurality of data lines of a display;

a gate drive unit, when operable, drives a plurality of gate lines of the display in an order based on a row enable signal;

a drive settle detection circuit operably coupled to the data drive unit, wherein the drive settle detect circuit is operable to:

for an activated gate line of the plurality of gate lines, monitoring a set of data drive signals of the plurality of data drive signals; and when each drive signal of the set of drive signals has reached a corresponding settling threshold, setting a settled signal for the activated gate line;

a row enable processing circuit operably coupled to the gate drive unit and to the drive settle detection circuit, wherein the row enable processing circuit is operable to:

end, as part of the row enable signal, activation of the activated gate line based on the settled signal; and activate, as part of the row enable signal, another gate line of the plurality of gate lines based on the settled signal.

2. The display control unit of claim 1, wherein the drive settle detection circuit comprises:

a first circuit operably coupled to:

create a first settling threshold based on a first data drive signal of the set of data drive signals;

create a representation of the first data drive signal;

drive the representation of the first data drive signal onto a first data line of the plurality of data lines, wherein electrical characteristics of the first data line affect the representation of the first data drive signal;

compare the affected representation of the first data drive signal with the first settling threshold; and when the affected representation of the first data drive signal compares favorably with the first settling threshold, set a first drive line settled signal;

a second circuit operably coupled to:

create a second settling threshold based on a second data drive signal of the set of data drive signals;

create a representation of the second data drive signal;

drive the representation of the second data drive signal onto a second data line of the plurality of data lines, wherein electrical characteristics of the second data line affect the representation of the second data drive signal;

compare the affected representation of the second data drive signal with the second settling threshold; and when the affected representation of the second data drive signal compares favorably with the second settling threshold, set a second drive line settled signal; and a row settle module operably coupled to set the settled signal for the activated gate line when a set of drive line settled signals for the set of data drive signals is set, wherein the set of drive line settled signals includes the first and second drive line settled signals.

3. The display control unit of claim 2, wherein the row settle module comprises:

a set of transistors operable to receive the set of drive line settled signals;

an impedance circuit coupled to a transistor of the set of transistors; and a settle detect drive circuit coupled to another transistor of the set of transistors and to the impedance circuit, wherein the settle detect drive circuit generates a settle detect drive signal based on the row enable signal;

wherein, when the set of drive line settled signals is set, the set of transistors provides the settle detect drive signal to the impedance; and wherein, when the settled detect drive signal is provided to the impedance, a signal imposed on the impedance produces the settled signal.

4. The display control unit of claim 1, wherein the drive settle detection circuit comprises:

a first circuit including:

a first operational amplifier having:

a first input for receiving a first data drive signal of the set of data drive signals;

a second input; and an output coupled to the second input, wherein the output drives a first representation of the first data drive signal onto a first data line of the plurality of data lines; and a first comparator having:

a first input for receiving the first representation of the first data drive signal;

a second input for receiving a second representation of the first data drive signal; and an output that represents a comparison of the first and second representations of the first data drive signal to produce a comparison output; and a first logic circuit to generate a first drive line settled signal based on the comparison output and the first data drive signal;

a second circuit including:

a second operational amplifier having:

a first input for receiving a second data drive signal of the set of data drive signals;

a second input; and an output coupled to the second input, wherein the output drives a first representation of the second data drive signal onto a second data line of the plurality of data lines; and a second comparator having:

a first input for receiving the second representation of the first data drive signal;

a second input for receiving a second representation of the second data drive signal; and an output that represents a comparison of the first and second representations of the second data drive signal to produce a second comparison output; and a second logic circuit to generate a second drive line settled signal based on the second comparison output and the second data drive signal; and a row settle module operably coupled to set the settled signal for the activated gate line when a set of drive line settled signals for the set of data drive signals is set, wherein the set of drive line settled signals includes the first and second drive line settled signals.

5. The display control unit of claim 1, wherein the row enable processing circuit comprises:

a row signal generator operable to:

generate the row enable signal based on a plurality of settled signals wherein the plurality of settled signals includes the settled signal; and generate a gate drive selection signal based on the plurality of settled signals and a desired ordering of enabling the plurality of gate lines; and a selection circuit operable to provide the row enable signal to a plurality of gate drive circuits of the gate drive unit in accordance with the row selection signal, wherein the plurality of gate drive circuits is coupled to the plurality of gate lines.

6. The display control unit of claim 1, wherein the data drive unit comprises:

a plurality of data drive circuits operably coupled to produce the plurality of data drive signals based on pixel line data.

7. The display control unit of claim 1, wherein the gate drive unit comprises:

a plurality of gate drive circuits, wherein:

a first gate drive circuit of the plurality of gate drive circuit is activated in accordance with the row enable signal to drive a first gate line of the plurality of gate lines; and a second gate drive circuit of the plurality of gate drive circuit is activated in accordance with the row enable signal to drive a second gate line of the plurality of gate lines.

8. The display control unit of claim 1 further comprises one of:

a number of data drive signals in the set of data drive signals equals a number of data drive signals of the plurality of data drive signals; and the number of data drive signals in the set of data drive signals is less than the number of data drive signals of the plurality of data drive signals.

9. A display comprises:

a display unit including:

a plurality of pixel cells;

a plurality of gate lines coupled to the plurality of pixel cells; and a plurality of drive lines coupled to the plurality of pixel cells; and a display control unit including:

a data drive unit, when operable, generates a plurality of data drive signals for driving the plurality of data lines;

a gate drive unit, when operable, generates gate drive signals for driving the plurality of gate lines of the display in an order based on a row enable signal;

a drive settle detection circuit operably coupled to the data drive unit, wherein the drive settle detect circuit is operable to:

for an activated gate line of the plurality of gate lines, monitoring a set of data drive signals of the plurality of data drive signals; and when each drive signal of the set of drive signals has reached a corresponding settling threshold, setting a settled signal for the activated gate line;

a row enable processing circuit operably coupled to the gate drive unit and to the drive settle detection circuit, wherein the row enable processing circuit is operable to:

end, as part of the row enable signal, activation of the activated gate line based on the settled signal; and activate, as part of the row enable signal, another gate line of the plurality of gate lines based on the settled signal.

10. The display of claim 9, wherein the drive settle detection circuit comprises:

a first circuit operably coupled to:

create a first settling threshold based on a first data drive signal of the set of data drive signals;

create a representation of the first data drive signal;

drive the representation of the first data drive signal onto a first data line of the plurality of data lines, wherein electrical characteristics of the first data line affect the representation of the first data drive signal;

compare the affected representation of the first data drive signal with the first settling threshold; and when the affected representation of the first data drive signal compares favorably with the first settling threshold, set a first drive line settled signal;

a second circuit operably coupled to:

create a second settling threshold based on a second data drive signal of the set of data drive signals;

create a representation of the second data drive signal;

drive the representation of the second data drive signal onto a second data line of the plurality of data lines, wherein electrical characteristics of the second data line affect the representation of the second data drive signal;

compare the affected representation of the second data drive signal with the second settling threshold; and when the affected representation of the second data drive signal compares favorably with the second settling threshold, set a second drive line settled signal; and a row settle module operably coupled to set the settled signal for the activated gate line when a set of drive line settled signals for the set of data drive signals is set, wherein the set of drive line settled signals includes the first and second drive line settled signals.

11. The display of claim 10, wherein the row settle module comprises:

a set of transistors operable to receive the set of drive line settled signals;

an impedance circuit coupled to a transistor of the set of transistors; and a settle detect drive circuit coupled to another transistor of the set of transistors and to the impedance circuit, wherein the settle detect drive circuit generates a settle detect drive signal based on the row enable signal;

wherein, when the set of drive line settled signals is set, the set of transistors provides the settle detect drive signal to the impedance; and wherein, when the settled detect drive signal is provided to the impedance, a signal imposed on the impedance produces the settled signal.

12. The display of claim 9, wherein the drive settle detection circuit comprises:

a first circuit including:

a first operational amplifier having:

a first input for receiving a first data drive signal of the set of data drive signals;

a second input; and an output coupled to the second input, wherein the output drives a first representation of the first data drive signal onto a first data line of the plurality of data lines; and a first comparator having:

a first input for receiving the first representation of the first data drive signal;

a second input for receiving a second representation of the first data drive signal; and an output that represents a comparison of the first and second representations of the first data drive signal to produce a comparison output; and a first logic circuit to generate a first drive line settled signal based on the comparison output and the first data drive signal;

a second circuit including:

a second operational amplifier having:

a first input for receiving a second data drive signal of the set of data drive signals;

a second input; and an output coupled to the second input, wherein the output drives a first representation of the second data drive signal onto a second data line of the plurality of data lines; and a second comparator having:

a first input for receiving the second representation of the first data drive signal;

a second input for receiving a second representation of the second data drive signal; and an output that represents a comparison of the first and second representations of the second data drive signal to produce a second comparison output; and a second logic circuit to generate a second drive line settled signal based on the second comparison output and the second data drive signal; and a row settle module operably coupled to set the settled signal for the activated gate line when a set of drive line settled signals for the set of data drive signals is set, wherein the set of drive line settled signals includes the first and second drive line settled signals.

13. The display of claim 9, wherein the row enable processing circuit comprises:

a row signal generator operable to:

generate the row enable signal based on a plurality of settled signals wherein the plurality of settled signals includes the settled signal; and generate a gate drive selection signal based on the plurality of settled signals and a desired ordering of enabling the plurality of gate lines; and a selection circuit operable to provide the row enable signal to a plurality of gate drive circuits of the gate drive unit in accordance with the row selection signal, wherein the plurality of gate drive circuits is coupled to the plurality of gate lines.

14. The display of claim 9, wherein the data drive unit comprises:

a plurality of data drive circuits operably coupled to produce the plurality of data drive signals based on pixel line data.

15. The display of claim 9, wherein the gate drive unit comprises:

a plurality of gate drive circuits, wherein:

a first gate drive circuit of the plurality of gate drive circuit is activated in accordance with the row enable signal to drive a first gate line of the plurality of gate lines; and a second gate drive circuit of the plurality of gate drive circuit is activated in accordance with the row enable signal to drive a second gate line of the plurality of gate lines.

16. The display of claim 9 further comprises one of:

a number of data drive signals in the set of data drive signals equals a number of data drive signals of the plurality of data drive signals; and the number of data drive signals in the set of data drive signals is less than the number of data drive signals of the plurality of data drive signals.

* * * * *